United States Patent [19]

Quayle et al.

[11] Patent Number: 4,743,818
[45] Date of Patent: May 10, 1988

[54] MICROPROCESSOR BASED MOTOR PROTECTIVE RELAY WITH ROTOR TEMPERATURE DETECTOR

[75] Inventors: Bruce R. Quayle, Asheville; Edward C. Prather, Hendersonville, both of N.C.

[73] Assignee: Westinghouse Electric Corp., Pittsburgh, Pa.

[21] Appl. No.: 32,909

[22] Filed: Mar. 31, 1987

[51] Int. Cl.$^4$ .................... H02H 7/08; G05D 23/00
[52] U.S. Cl. .................... 318/473; 318/334; 361/24
[58] Field of Search ............... 318/334, 399, 471, 472, 318/473, 783, 800, 806; 361/23, 24, 25, 31

[56] References Cited

U.S. PATENT DOCUMENTS

| | | | |
|---|---|---|---|
| 4,434,390 | 2/1984 | Elms | 318/473 |
| 4,467,260 | 8/1984 | Mallick, Jr. et al. | 318/800 |
| 4,510,548 | 4/1985 | Boothman | 361/24 X |
| 4,672,288 | 6/1987 | Abbondanti | 318/806 X |

OTHER PUBLICATIONS

"IQ-2000 ™ Model B Motor Command System User's Manual", Apr., 1985, Relevant Material may be Found on any Page.

*Primary Examiner*—Bentsu Ro
*Attorney, Agent, or Firm*—M. J. Moran

[57] ABSTRACT

A motor protection relay is taught in which the temperature of a rotating rotor is inferred from the current flowing in the lines which supplies the motor and from resistance temperature detection devices in the stator of the motor. By utilizing a periodic predictable established interrupt routine within the software which controls the microprocessor which in turn controls the monitoring device the time based model for inferring rotor temperature can be freed of a requirement to use a fixed sampling time rather the time for calculations can be variable. The total number of counts that particular interrupt routine has taken place will be factored into the calculations to make the calculations accurate. The thermal model is further improved by expressing it in terms of current squared times time so that the component portions of the equation which represents the thermal model can use accumulator inputs into which values of line current squared have been previously placed.

13 Claims, 22 Drawing Sheets

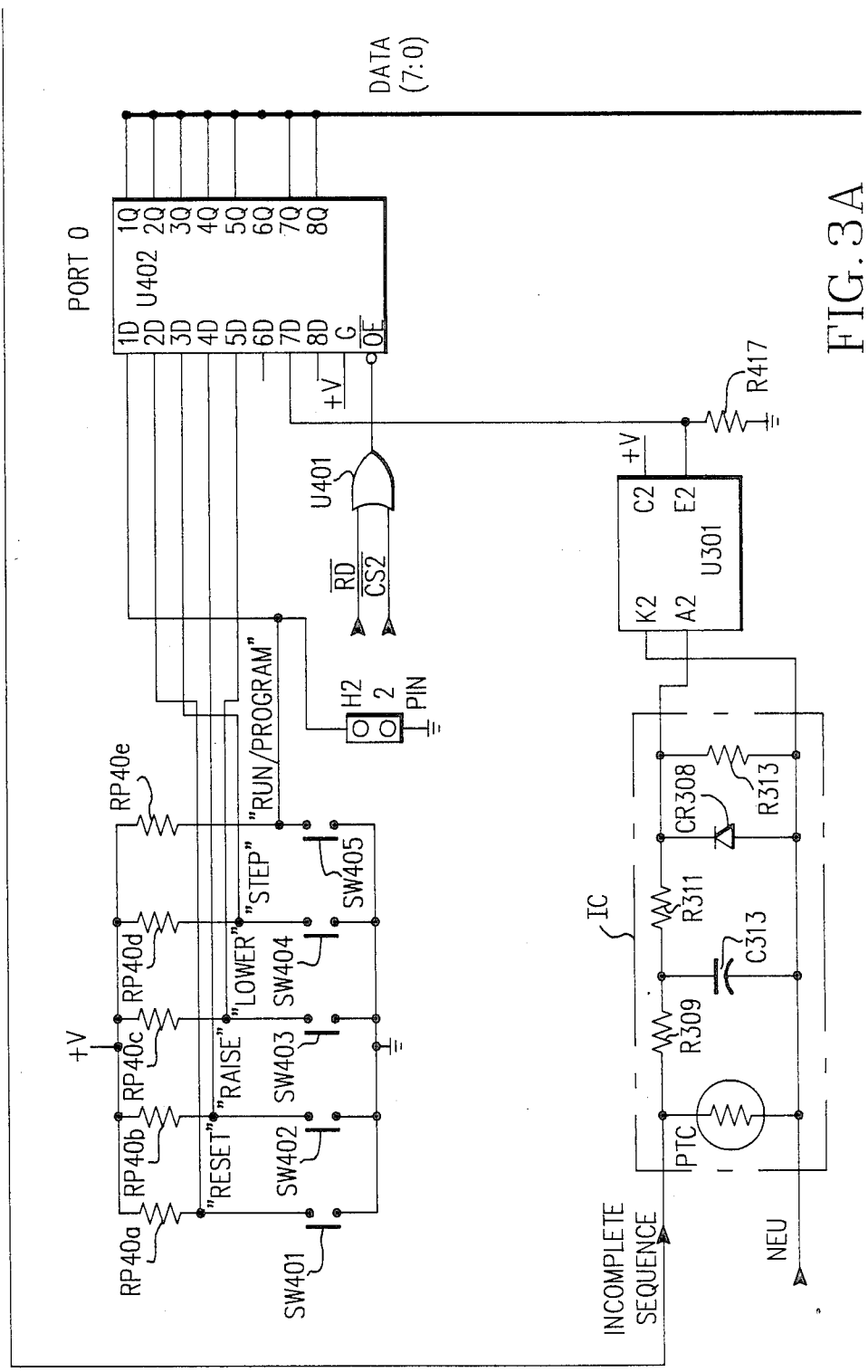

| FIG.3A | FIG.3B | FIG.3C |
| --- | --- | --- |
| FIG.3D | FIG.3E | FIG.3F |

FIG. 7

| LOCATIONS | IA(W) | | IB(W) | | IC(W) | | IA(W+120) | | IB(W+120) | | IC(W+120) | | IA(W+240) | | IB(W+240) | | IC(W+240) | |
|---|---|---|---|---|---|---|---|---|---|---|---|---|---|---|---|---|---|---|
| W | | | | | | | | | | | | | | | | | | |
| 0° | 0 | 0 | 1 | -.87 | 2 | .87 | 3 | .87 | 4 | 0 | 5 | -.87 | 6 | -.87 | 7 | .87 | 8 | 0 |
| 10° | 9 | .17 | 10 | -.94 | 11 | .77 | 12 | .77 | 13 | .17 | 14 | -.94 | 15 | -.94 | 16 | .77 | 17 | .17 |
| 20° | 18 | .34 | 19 | -.99 | 20 | .64 | 21 | .64 | 22 | .34 | 23 | -.99 | 24 | -.99 | 25 | .64 | 26 | .34 |
| 30° | 27 | .5 | 28 | -1.0 | 29 | .5 | 30 | .5 | 31 | .5 | 32 | -1.00 | 33 | -1.00 | 34 | .5 | 35 | .5 |
| 40° | 36 | .64 | 37 | -.99 | 38 | .34 | 39 | .34 | 40 | .64 | 41 | -.99 | 42 | -.99 | 43 | .34 | 44 | .64 |
| 50° | 45 | .77 | 46 | -.94 | 47 | .17 | 48 | .17 | 49 | .77 | 50 | -.94 | 51 | -.94 | 52 | .17 | 53 | .77 |
| 60° | 54 | .87 | 55 | -.87 | 56 | 0 | 57 | 0 | 58 | .87 | 59 | -.87 | 60 | -.87 | 61 | 0 | 62 | .87 |
| 70° | 63 | .94 | 64 | -.77 | 65 | -.17 | 66 | -.17 | 67 | .94 | 68 | -.77 | 69 | -.77 | 70 | -.17 | 71 | .94 |
| 80° | 72 | .99 | 73 | -.64 | 74 | -.34 | 75 | -.34 | 76 | .99 | 77 | -.64 | 78 | -.64 | 79 | -.34 | 80 | .99 |
| 90° | 81 | 1.00 | 82 | -.5 | 83 | -.5 | 84 | -.5 | 85 | 1.0 | 86 | -.5 | 87 | -.5 | 88 | -.5 | 89 | 1.00 |
| 100° | 90 | .99 | 91 | -.34 | 92 | -.64 | 93 | -.64 | 94 | .99 | 95 | -.34 | 96 | -.34 | 97 | -.64 | 98 | .99 |
| 110° | 99 | .94 | 100 | -.17 | 101 | -.77 | 102 | -.77 | 103 | .94 | 104 | -.17 | 105 | -.17 | 106 | -.77 | 107 | .87 |

FIG. 11

| LOCATIONS W | IA(W) | IB(W) | IC(W) | IA(W+120) | IB(W+120) | IC(W+120) | IA(W+240) | IB(W+240) | IC(W+240) |
|---|---|---|---|---|---|---|---|---|---|
| 0° | 0 (0) | +.87 (1) | 0 (2) | 0 (3) | 0 (4) | +.87 (5) | +.87 (6) | 0 (7) | 0 (8) |
| 10° | 0 (9) | +.94 (10) | 0 (11) | 0 (12) | 0 (13) | +.94 (14) | +.94 (15) | 0 (16) | 0 (17) |
| 20° | 0 (18) | +.99 (19) | 0 (20) | 0 (21) | 0 (22) | +.99 (23) | +.99 (24) | 0 (25) | 0 (26) |
| 30° | 0 (27) | +1.0 (28) | 0 (29) | 0 (30) | 0 (31) | +1.00 (32) | +1.00 (33) | 0 (34) | 0 (35) |
| 40° | 0 (36) | +.99 (37) | 0 (38) | 0 (39) | 0 (40) | +.99 (41) | +.99 (42) | 0 (43) | 0 (44) |
| 50° | 0 (45) | +.94 (46) | 0 (47) | 0 (48) | 0 (49) | +.94 (50) | +.94 (51) | 0 (52) | 0 (53) |
| 60° | 0 (54) | +.87 (55) | 0 (56) | 0 (57) | 0 (58) | +.87 (59) | +.87 (60) | 0 (61) | 0 (62) |
| 70° | 0 (63) | +.77 (64) | +.17 (65) | +.17 (66) | 0 (67) | +.77 (68) | +.77 (69) | 0 (70) | 0 (71) |
| 80° | 0 (72) | +.64 (73) | +.34 (74) | +.34 (75) | 0 (76) | +.64 (77) | +.64 (78) | +.17 (79) | 0 (80) |
| 90° | 0 (81) | +.5 (82) | +.5 (83) | +.5 (84) | 0 (85) | +.5 (86) | +.5 (87) | +.34 (88) | 0 (89) |
| 100° | 0 (90) | +.34 (91) | +.64 (92) | +.64 (93) | 0 (94) | +.34 (95) | +.34 (96) | +.5 (97) | 0 (98) |
| 110° | 0 (99) | +.17 (100) | +.77 (101) | +.77 (102) | 0 (103) | +.17 (104) | +.17 (105) | +.64 (106) | 0 (107) |

MICROPROCESSOR BASED MOTOR PROTECTIVE RELAY WITH ROTOR TEMPERATURE DETECTOR

CROSS-REFERENCE TO RELATED APPLICATIONS

The subject matter of this application is related to the following concurrently-filed copending U.S. patent applications:

1. U.S. patent application Ser. No. 032,885 entitled "Microprocessor Based Motor Protective Relay With Maximum Number of Starts Per Time Interval Limiter" by B. R. Quayle.
2. U.S. patent application Ser. No. 032,908 entitled "Microprocessor Based Motor Protective Relay With Transition Control" by E. C. Prather.
3. U.S. patent application Ser. No. 032,845 entitled "Microprocessor Based Motor Protective Relay With Half Wave Sampling" by E. C. Prather.
4. U.S. patent application Ser. No. 032,910 entitled "Microprocessor Based Motor Protective Relay With Function Linked Scrolling Display" by B. R. Quayle and E. C. Prather.

BACKGROUND OF THE INVENTION

The subject matter of this invention relates generally to motor protection devices and more specifically to a microprocessor controlled protective relays of the kind that are usable to inferentially determine the temperature of the rotor of the monitored motor.

DESCRIPTION OF THE PRIOR ART

Motor monitoring apparatus which determine the temperature of the rotating rotor of a motor inferentially are known. One example can be found in U.S. Pat. No. 4,434,390 issued on Feb. 28, 1984 to R. T. Elms and entitled "Motor Control Apparatus With Parallel Input, Serial Output Signal Conditioning Means." The latter-mentioned patent is assigned to the same assignee as the present invention. Another example can be found in a user's manual entitled "IQ-2000 TM Model B Motor Command System User's Manual" TD-11-720-B, provided by the Control Division of the Westinghouse Electric Corporation. A well-known thermal model which is utilized for predicting or inferring the temperature of a rotating rotor is known. Basically, the known thermal model utilizes known stator temperature and stator winding current. Stator current is related to rotor current which, in turn, causes heating of the rotor. One of the important factors in the prior art model is time; more specifically, the time between when a first rotor temperature has been inferred and a subsequent determination of rotor temperature. Since heat is a quantity which may accumulate over time in the rotor of a motor, a previous value of rotor temperature is a factor in determining later temperature in the thermal model. In the known art, the thermal model is solved by utilizing a fixed time period between subsequent temperature calculated. The fixed time period or sampling cycle simplified the calculations in the prior art; however, it provided a disadvantage. The fixed time period limited the opportunity to expand the functions of the monitoring apparatus. In the past, because of the constraint of the fixed sampling time, the additional computational operations in the algorithm that controlled the metering module required a judicious choice of time between sampling intervals. Unfortunately, the fixed sampling interval set an upper limit for the amount of computation which could be added or utilized in the overall protective system.

It would be advantageous if a way could be found to calculate or infer the temperature of a rotor using known thermal models and input parameters and variables in which the calculation could be done on a variable time basis rather than on a fixed time basis. This would allow for expansion of the overall motor protection scheme.

SUMMARY OF THE INVENTION

In accordance with the invention, the equations of the well-known thermal module are rewritten so that the temperature reference is made equivalent to an $I^2t$ reference. These references are then reduced to a per unit basis by the locked rotor $I^2t$ value. Furthermore, the difference in time between elapsed calculations is expressed as a function of the number of 1/6 line cycle interrupts that have occurred since the last update.

BRIEF DESCRIPTION OF THE DRAWINGS

Reference may be had to the preferred embodiment of the invention shown in the accompanying drawings, in which:

FIGS. 3A through 3F show a schematic diagram partially in block diagram form, for the relay embodying the teachings of the present invention;

FIG. 7 shows a memory map for digitally stored values of the line currents of FIG. 5;

FIG. 11 shows a memory map similar to that of FIG. 7 but where entries for positive halfwave portions of the currents of FIG. 5 have been deleted;

DESCRIPTION OF THE PREFERRED EMBODIMENT

Figure 1:
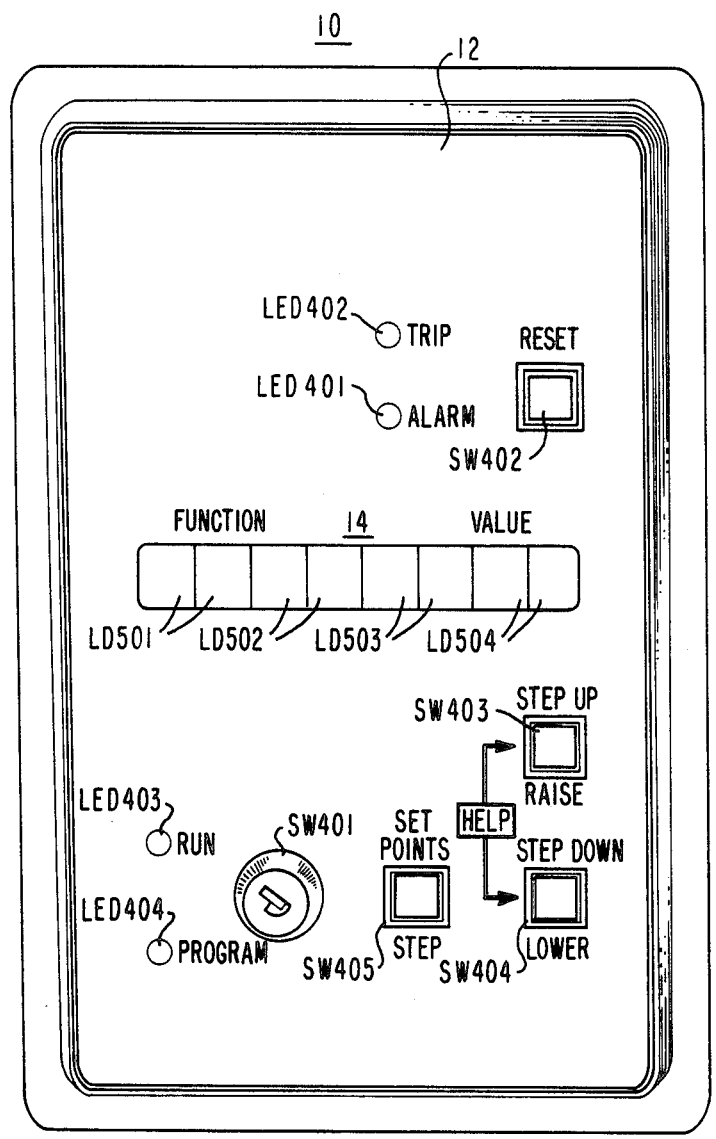
FIG. 1 shows the front panel of the motor protection relay utilizing the present invention.

Referring now to FIG. 1, the front panel of a multifunction motor protective relay 10 which monitors three-phase AC current and makes separate trip and alarm decisions based on pre-programmed motor current and temperature conditions is shown. Device or relay 10 may utilize motor protection algorithms based on positive and negative sequence current sampling and true RMS calculations. There is provided for relay 10 a front panel 12 upon which are disposed or mounted active and passive protective and programming components. There is provided a control switch SW401 which may be disposed in either the "RUN" or "PROGRAM" disposition. There are also provided a "RESET" switch SW402, a "SETPOINTS"-"STEP" switch SW405, a "STEP UP"-"RAISE" switch SW403 and a "STEP DOWN"-"LOWER" switch SW404. In addition, there are provided four light-emitting diodes: LED 401 which indicates "ALARM", LED 402, which indicates "TRIP", LED 403 which indicates "RUN", and LED 404 which indicates "PROGRAM". There is also provided a display window 14 which comprises eight alphanumeric characters which indicate or display setpoint values and selections, metered data of actual operating conditions, causes of trip or alarm conditions, and scrolling help messages. The window 14 displays the function on the left side of the display followed by the actual "VALUE" on the right side thereof. Each of the aforementioned switches SW402 through SW405 operates differently depending upon the mode that the switch SW401 is disposed in. For example, when the switch SW401 is placed in the PROGRAM mode, switch SW405 operates in the STEP mode whereupon use thereof forces the relay 10 to sequence through predetermined memory stored setpoint functions. The switch SW403 will operate in the RAISE mode which causes programmed incremental increases in the displayed numeric setpoint value associated with each chosen FUNCTION when depressed, the switch SW404 will operate in the LOWER mode which causes programmed incremental decreases in the displayed numeric setpoint value associated with the chosen FUNCTION when depressed. The RESET switch SW402 returns aforementioned menu to the beginning of the setpoint list when depressed. The aforementioned menu is incremented by actuation of switch SW405 when it operates in the STEP mode. The functions and values described with respect to the switches are displayed in the display window 14. When the switch SW401 is placed in a RUN mode, the multifunction switches SW402-SW405 operate differently. Switch SW405 alternates between the METERED and SETPOINTS menus. This allows an operator to review previously chosen setpoints while the motor is running. The switch SW403 operates in the STEP UP mode whereupon it causes the display 14 to increment through a sequence of metered levels of individual functions. The switch SW404 operates on the STEP DOWN mode to decrement the display 14. The ALARM indicator LED 401 and the TRIP indicator LED 402 when illuminated indicate that either a trip or alarm condition exists. If both the switches SW403 and SW404 are pushed simultaneously, that is, within 75 milliseconds of each other, the HELP mode which will be described hereinafter is actuated.

Figure 2:
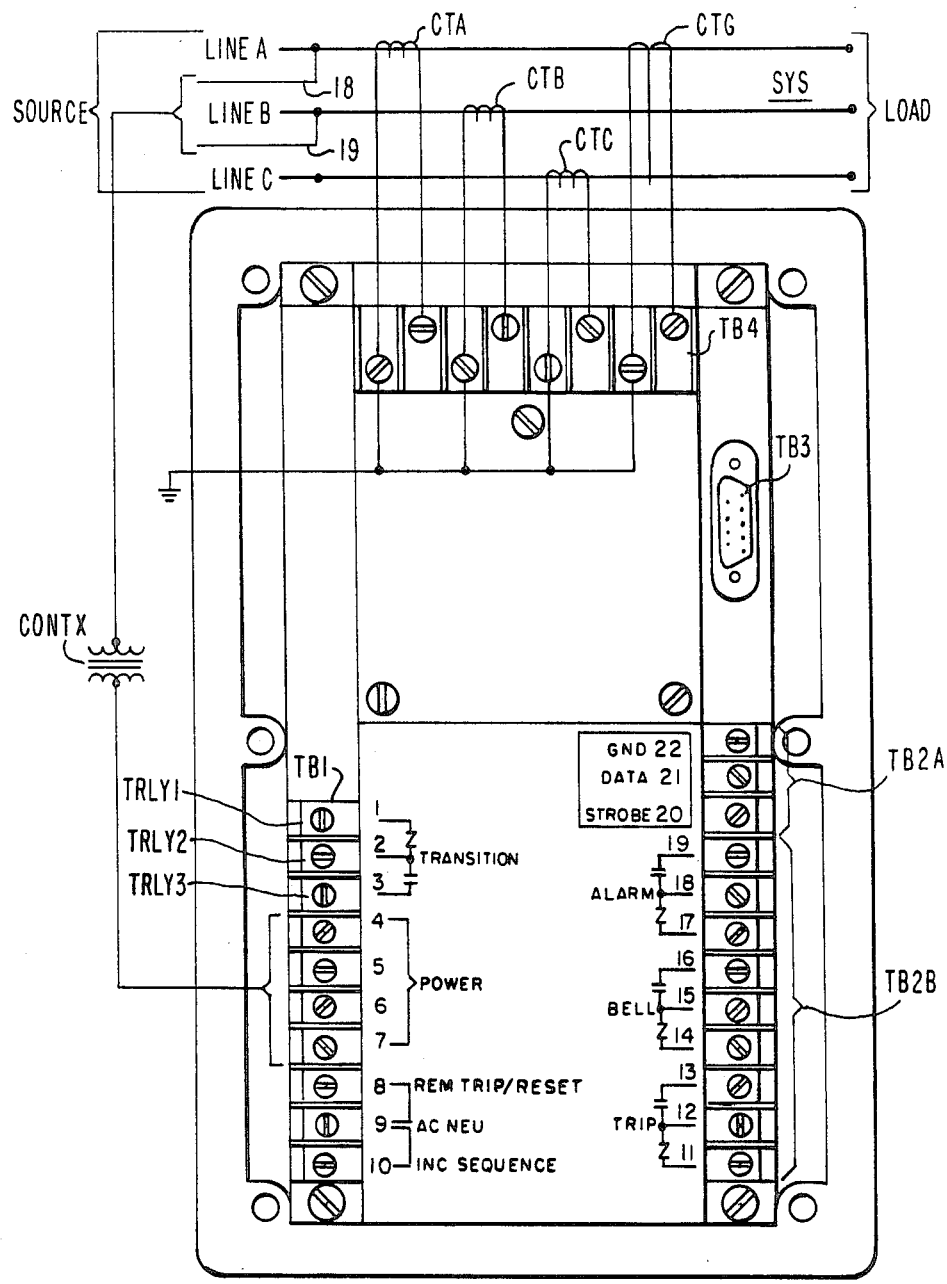
FIG. 2 shows a view of the back of the relay shown in FIG. 1 connected in a protective arrangement with an electrical system.
Figure 3B:
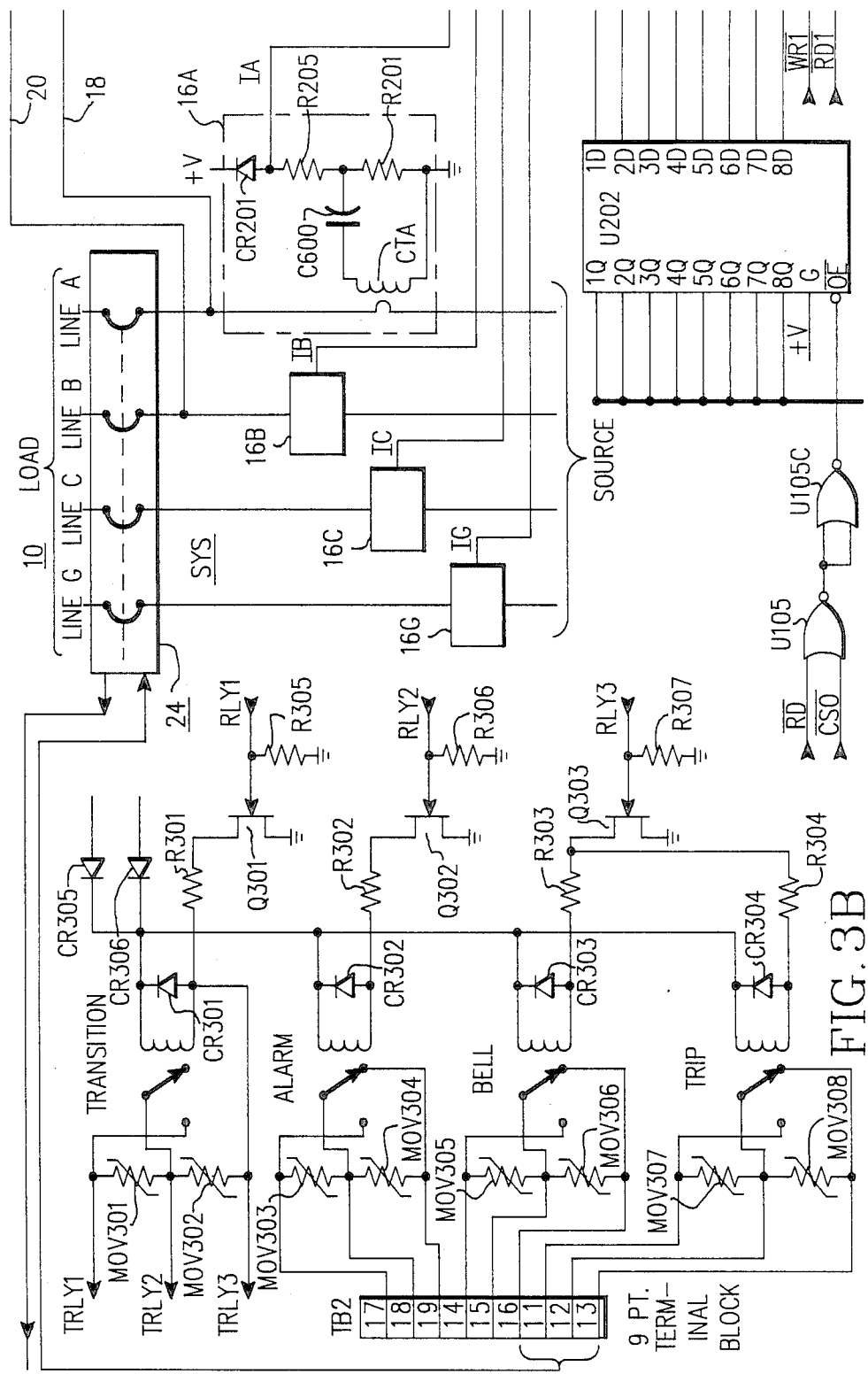
Figure 3C:
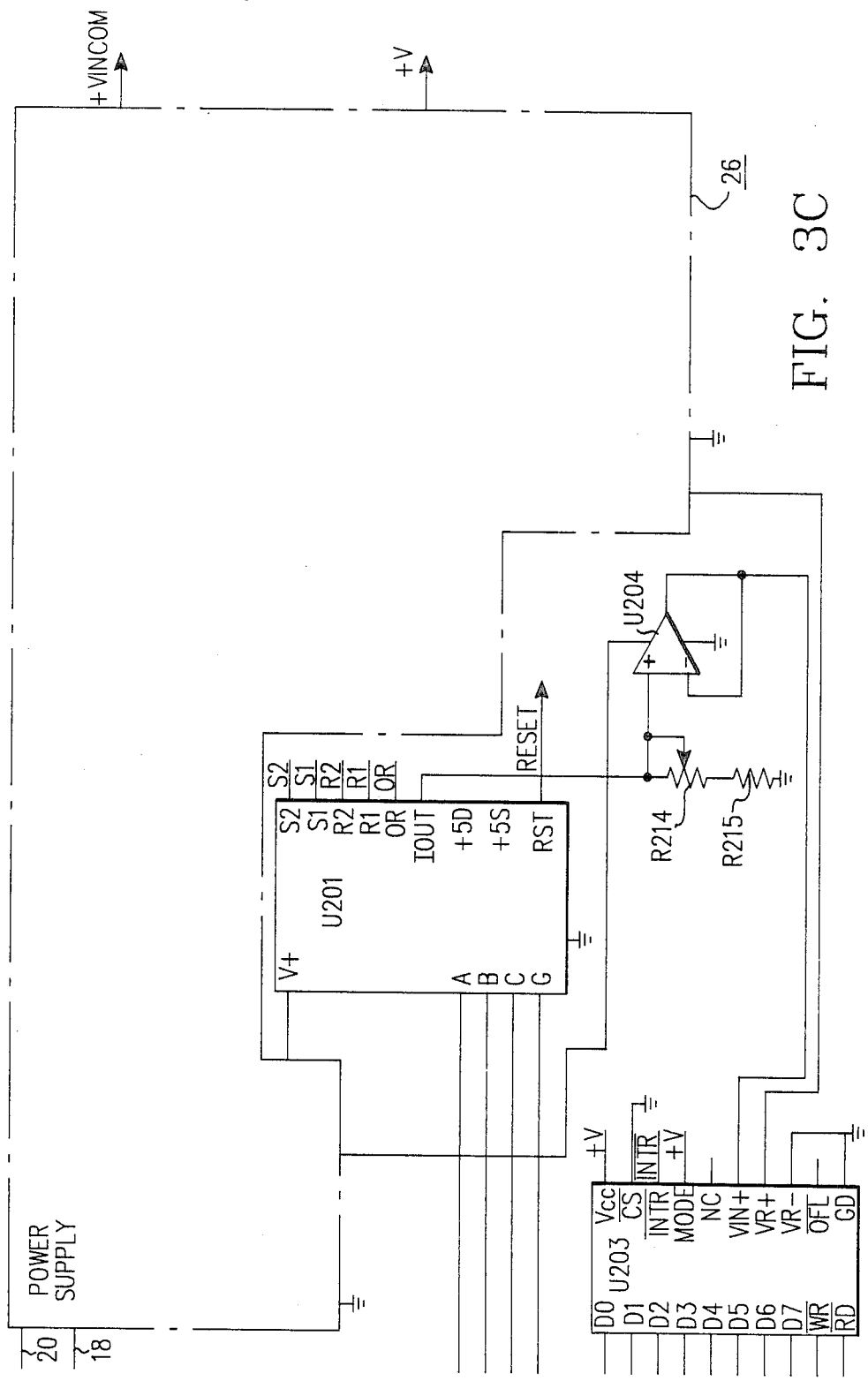
Figure 3D:
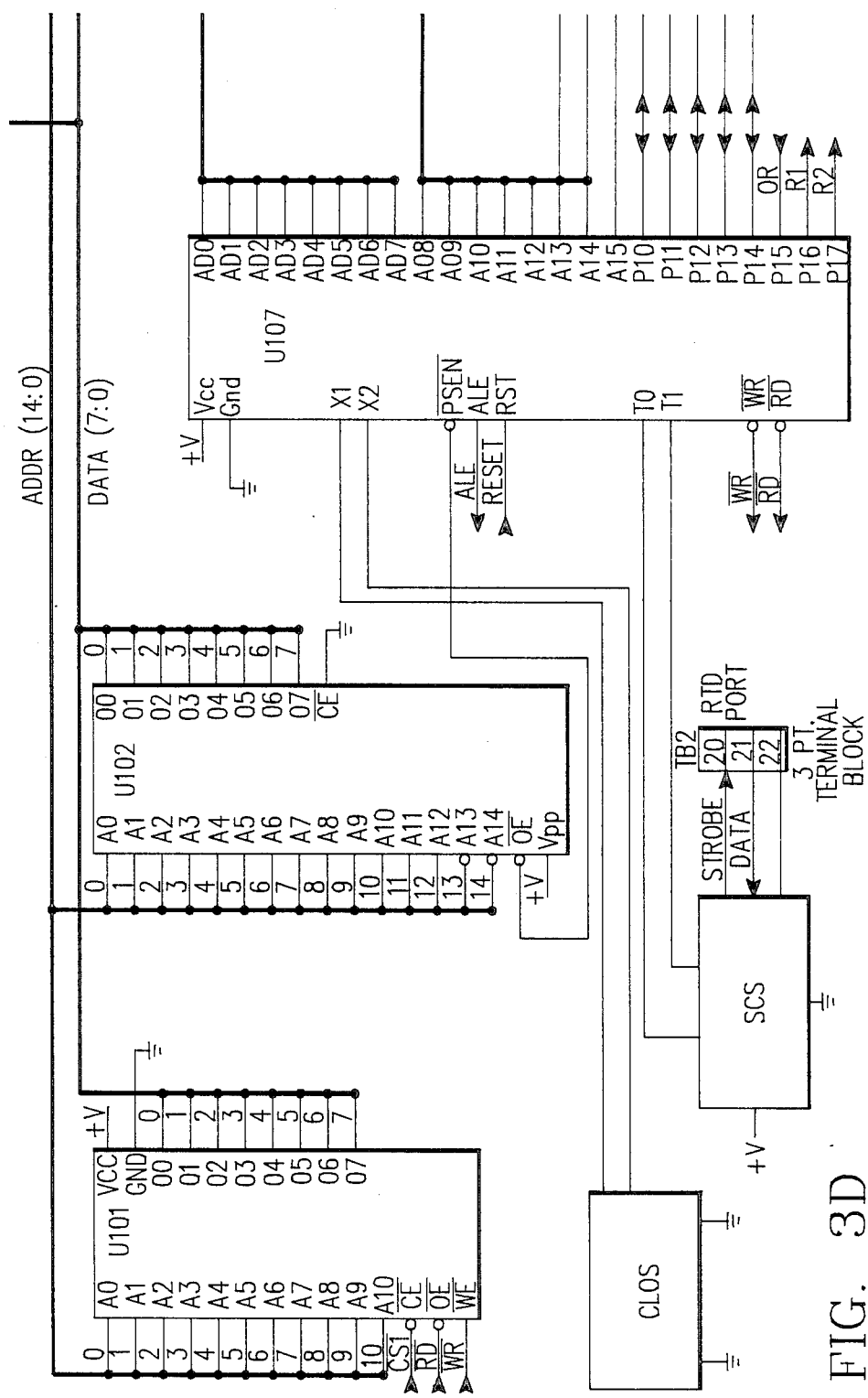
Figure 3E:
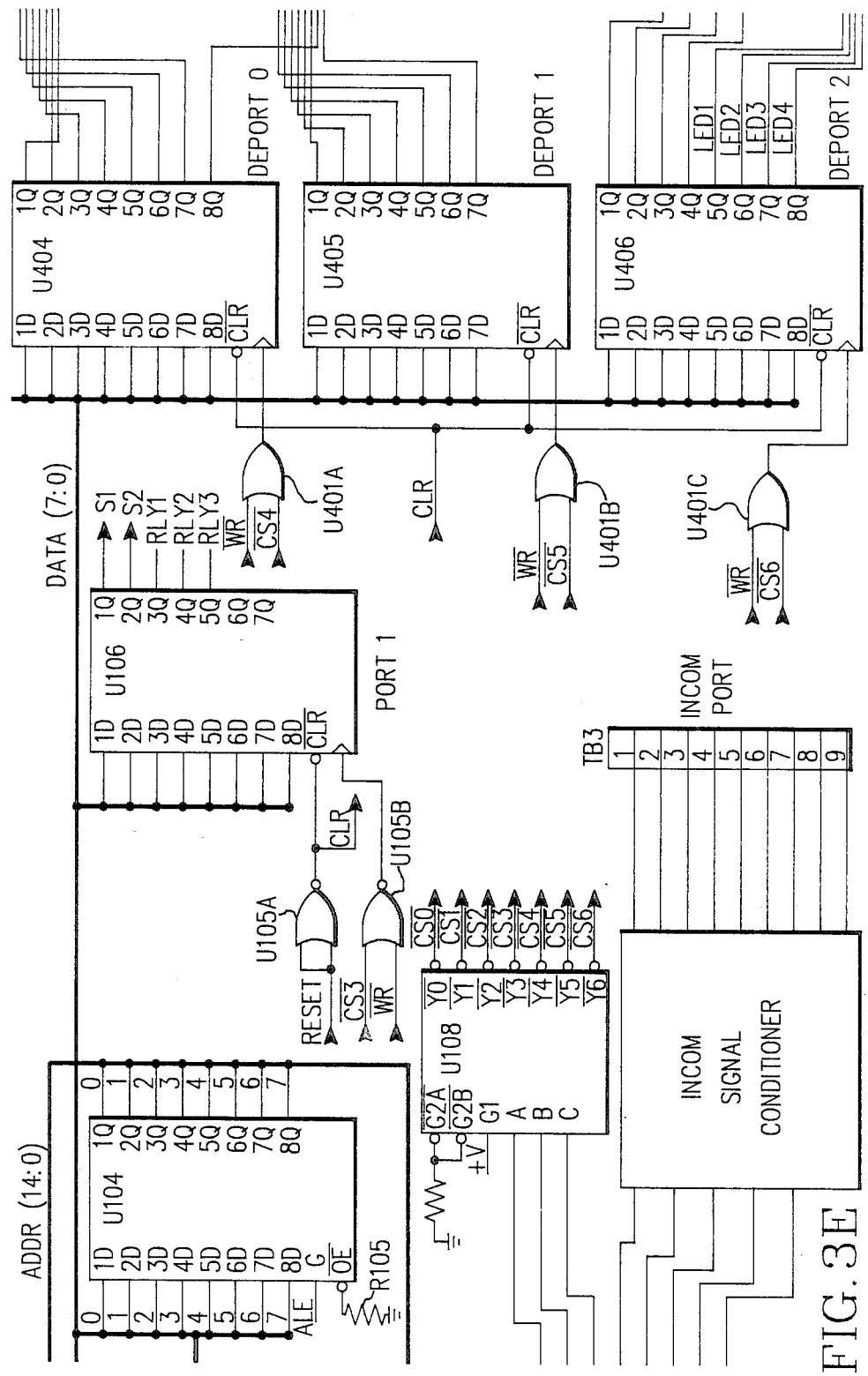
Figure 3F:
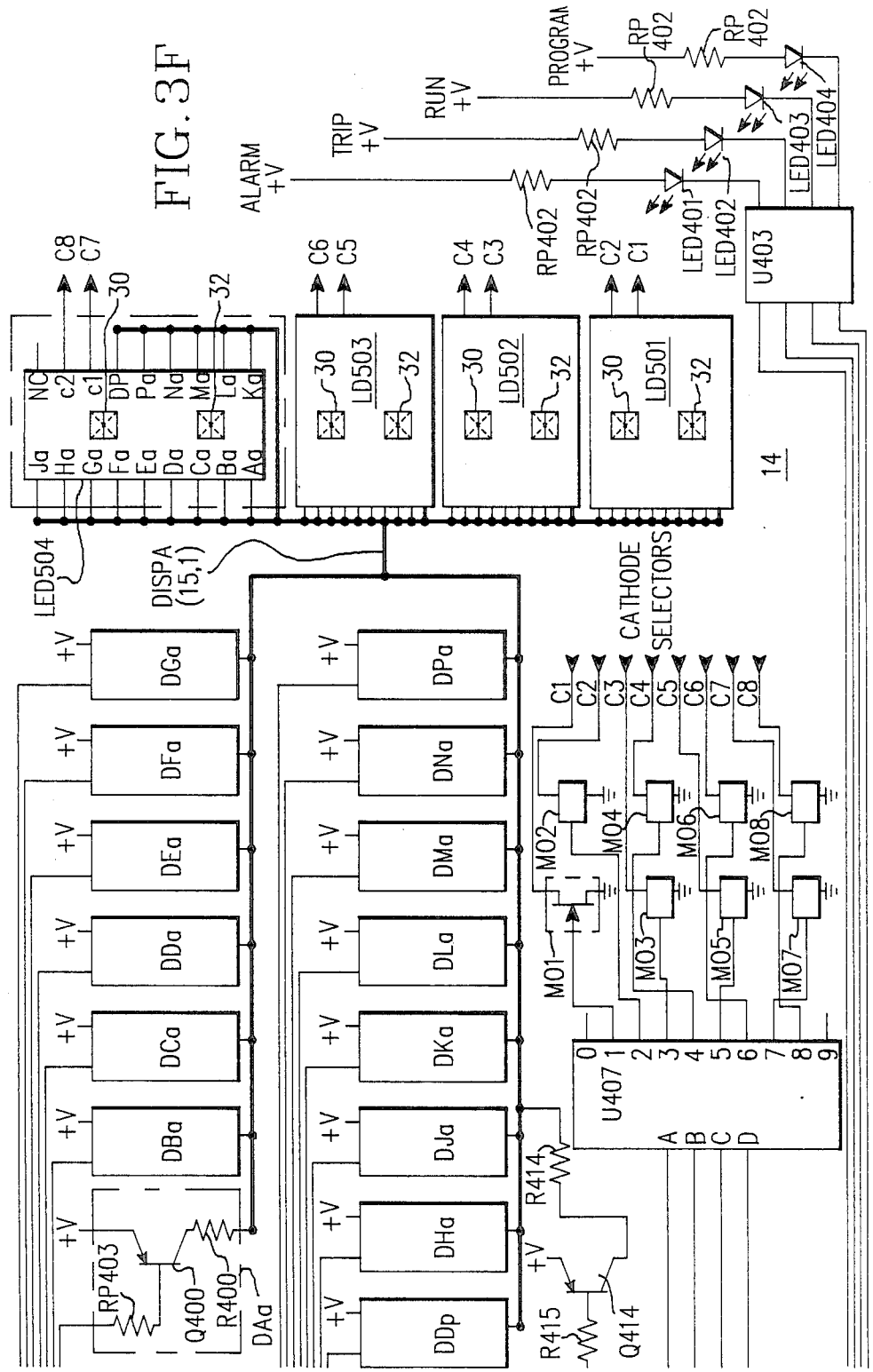

Referring now to FIG. 2, the back panel of relay 10 is shown. In addition, a portion of a system SYS monitored and protected by the relay 10 is also shown. There are provided a SOURCE of electrical power on the left and a LOAD on the right which in a preferred embodiment of the invention comprises a three phase electrical motor and motor contactor. Single phase power for the relay 10 may be provided by conductors 18 and 20 interconnected with power lines LINE A and LINE B, respectively, and provided by way of control transformer CONTX to the POWER input section of terminal board TB1. Current transformers CTA, CTB, CTC and CTG for power lines LINE A, LINE B, LINE C, and LINE G (ground line) respectively are interconnected with appropriate terminals on terminal board TB4. There is also provided a communication terminal represented by plug connector TB3. TRANSITION related signals are provided at terminals 1, 2 and 3 of the terminal board TB1. Low voltage terminal board TB2A provides a STROBE terminal, a DATA terminal, and a GND terminal (ground) for utilization with an RTD, resistance temperature detector, system at terminal board TB2. The system RTD which may measure motor stator winding temperatures at terminals 20, 21 and 22, respectively.

Figures 4, 8:
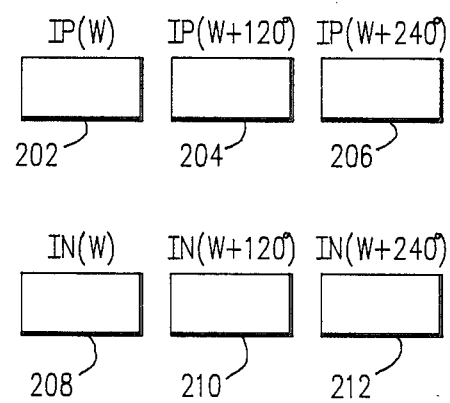
FIG. 4 shows the arrangement for FIGS. 3A through 3F in order to depict the entire schematic diagram associated with the protective relay.
FIG. 8 shows intermediate accumulators for accumulating portions of positive and negative symmetrical components of the line currents associated with FIG. 5.

Referring now to FIGS. 3A through 3F and FIGS. 1, 2, and 4, the construction and operation of the relay 10 is described. FIG. 4 shows how FIGS. 3A through 3F are related to each other. There is shown the system SOURCE and LOAD and the three-phase lines, LINE A, LINE B, and LINE C. There is also shown a three phase line contactor on motor starter 24 which operates to open and close contacts to interconnect the LOAD to the SOURCE. Starter 24 may be an across the line starter or a low voltage starter. The contactor 24 may communicate with other portions of the relay 10 by way of terminal board TB2 in a manner to be described more fully hereinafter. Previously described power lines 18 and 20 feed an internal power supply 26 which is utilized to develop appropriate power at given voltages for the remaining portions of the circuitry of the relay 10. Power supply module 26 is shown in block diagram form. It may develop power at a voltage +V (5 volts in the preferred embodiment). In addition it may be utilized to develop a voltage −VINCOM for utilization with a communication network (not shown).

There are shown four current monitoring systems 16A, 16B, 16C and 16G for conductors, LINE A, LINE B, LINE C and ground fault, respectively. Systems 16B, 16C and 16G in a preferred embodiment of the invention are the same as system 16A, the details of which will be described immediately hereinafter in greater detail. Current monitor module 16A comprises a current transformer CTA which is interconnected with a capacitive element C600. One side of the current transformer CTA is grounded and the other side of the capacitive element C600 is connected to a junction between resistive elements R201 and R205. The other end of resistive element R201 is grounded and the other end of resistive element R205 is connected to the anode of a diode CR201, the cathode of which is connected to the +V power supply terminal of the power supply 26. There is provided at the junction between the anode of the diode CR201 and the resistive element R205 a conductor which is interconnected with terminal A of a custom chip U201. The voltage developed at this point is proportional to line current and so designated IA. The characteristics of the custom chip U201 are such that terminal A thereof attempts to maintain the voltage thereat at zero volts. However, because there is a voltage difference between this point and the junction between the resistive element R205 and the anode of the diode CR201, current will either be drawn out of the custom chip U201 on the negative half angle. It is also a characteristic of the chip U201 that it only reads negative values of AC voltage. It is also a characteristic of the chip U201 that the output terminal IOUT thereof will provide or mirror a current value which is related to the current sensed at the input terminal A. In a like manner, current sensing arrangements 16B, 16C and 16G are interconnected to provide current line representations IB, IC and IG, respectively, to input terminals B, C and G of the custom chip U201. The custom chip U201 provides only one output current IOUT which is related or proportional to negative values of alternating current at the input terminals A, B, C and G thereof. This means that the chip U201 provides a multiplexing function as determined by the signals S1 and S2 on the like-identified S1 and S2 input terminals thereof. Signals S1 and S2 are provided by a microprocessor U107 which will be described in greater detail hereinafter. The terminal IOUT provides a current related to the negative swing of AC current on the terminals A, B, C and G as a function of the input signals S1, S2 being in the following arrangement, respectively: A-(L,L), B-(H,L), C-(H,H), and G-(L,H). In each case, the S1 signal is given first and the S2 signal is given second. "H" means a digital high or "1" and an "L" means a digital low or "0". The characteristics of the system SYS as monitored by the custom chip U201 are such that the dynamic range thereof may vary widely. For instance, currents IA, IB, IC and IG may range from a few milliamps to many hundreds of milliamps. However, for purposes of simplicity and expensive, it is desirous to eventually convert signals which are related to these values to digital values using only eight bit logic. Such being the case, it is necessary to detect a range of outputs for the signals coming from the terminal IOUT of the chip U201. In order to accomplish this, the chip U201 has two ranging inputs R1 and R2 and an overrange output OR. During each sampling interval, the ranging inputs are first set up by the microprocessor to provide that the current at the terminal IOUT of chip U201 is equal to the input current. This is the lowest range for the current IOUT. If the chip U201 senses that the lowest range will not accommodate the current IOUT which is mirroring the input current IA then a signal is sent from the output range terminal OR of chip U201 to the microprocessor U107 whereupon the microprocessor U107 will change the current output range of the chip U201 by replacing the digital 0 on input terminal R1 thereof with a digital 1. This cuts the output current IOUT in half relative to the input current. This range information provided by the microprocessor is also stored in memory chip U101 for latter utilization with the output current IOUT sampled so that the actual value of line current can be reconstructed. In a like manner, the output current IOUT may be divided by 4 and 16 relative to the input current as the range signals are changed such that a digital 1 appears on terminal R2 and a digital 0 appears on terminal R1 for the divide by four range, or a digital 1 appears on both terminals R1 and R2 for a divide by 16 range.

The microprocessor U107 comprises eight parallel address-data terminals AD0 through AD7 for bidirectional movement of digital information between memories, input/output ports and the microprocessor U107. In addition, eight additional address terminals A08 through A14 are provided. The latter terminals provide address information to other portions of the relay 10 including memories. In the preferred embodiment of the invention, supplemental address locations A08 through A14 provide the highest bits of address information whereas the terminals AD0 through AD7 provide the lowest bits of address information. This means that 16 bits of address information always proceeds 8 bits of data. Terminals A13, A14 and A15 also supply digital information to a chip select multiplexer U108. The chip select multiplexer U108 has A, B and C inputs and outputs $\overline{Y0}$ through $\overline{Y6}$ upon which are disposed chip select signals $\overline{CS0}$ through $\overline{CS6}$, respectively. Depending upon the digital information provided to the A, B and C input terminals of the chip select circuit U108, one of the chip select $\overline{CS0}$ through $\overline{CS6}$ will go digitally low thus selecting one of the chips in the remaining portion of the relay 10 for utilization. It is to be understood that the microprocessor U107 operates on other portions of the relay sequentially. That is, chips or modules are selected for utilization by the microprocessor as a function of a program which controls the microprocessor and which actuates the chips in a predetermined sequence. Terminals P10 through P14 may receive input information from terminal board TB3 which is identified as the "INCOM PORT". This is shown for the purpose of illustration but does not constitute part of the present invention. Terminal P15 receives the overrange signal OR described previously with respect to the custom chip U201 and terminals P16 and 17 provide the output range signals R1 and R2 in response to the overrange signal OR. The microprocessor U107 will iterate through the possible range values until the overrange signal OR goes low including that chip U201 is supplying output current IOUT in the correct current range. Power is supplied to the microprocessor U107 at the Vcc input terminal thereof. The ground terminal GND of the microprocessor U107 is interconnected with system common or ground. There are provided two terminals X1 and X2 which are interconnected with the crystal control oscillator CLOS which provides the basic crystal controlled oscillator pulses for the timing of the microprocessor U107. There is also provided an output terminal ALE which provides an output signal ALE which is designated as the address latch enable signal and which provides an enabling signal to an address latch U104 which buffers and/or latches the output address values on the terminals AD0 through AD7 of the microprocessor U107. The latter signals are transferred from input terminals ID-8D through the address latch U104 upon the occurrence of the signal ALE to the output terminals of the address latch U104 which are designated 1Q through 8Q, respectively. These terminals then cooperate with a 14 bit address bus ADDR (14:0) which is also supplied by the higher level address signal A08 through A14 for addressing memories in the relay system 10 in a manner to be described hereinafter. The microprocessor also has a reset terminal RST which operates in conjunction with a reset signal RESET from the reset terminal RST of the custom chip U201 to reset the microprocessor U107 at its initial condition when power is first applied to the relay 10 by way of the power supply lines 18 and 20. The microprocessor provides read and write output signals $\overline{RD}$ and $\overline{WR}$ at read and write output terminals $\overline{RD}$ and $\overline{WR}$. These read and write signals are utilized in conjunction with the previously-described chip select signals $\overline{CS0}$-$\overline{CS6}$ to actuate predetermined chips within the relay system 10 to read data into or out of selected portions of the system as a function of a program or routine which controls the microprocessor U107.

There is provided a memory U102 which in a preferred embodiment of the invention is an erasable programmable read-only memory (EPROM) in which the basic control program for the microprocessor U107 may be stored in a 32K by 8 bit memory. This memory is accessed or strobed as a function of an output terminal $\overline{PSEN}$ for the microprocessor U107 in cooperation with an input terminal $\overline{OE}$ for the memory U102. In addition, the address location within the memory U102 from whence microprocessor control instructions are to be taken are accessed by way of address input terminals A0 through A14 of the memory U102. The data thus selected are available on eight parallel paths or terminals on the output terminals 00 through 07 of the memory U102. This data is provided to a data bus DATA (7:0) which is interconnected with the previously-described terminals AD0 through AD7 of the microprocessor U107. Consequently, upon appropriate addressing by the microprocessor U107 and strobing or pulsing of the input terminal $\overline{OE}$ of the memory chip U102 an instruction is provided to the microprocessor which in turn initiates the microprocessor function to be performed and also causes the address of the next program information location stored in the memory U102 to be made available at the output terminals 00 through 07 thereof. This is the basic way that the program for controlling the microprocessor U107 interacts with the microprocessor U107.

There is provided a zero power random access memory U101 into which data associated, for example, with currents IA, IB, IC and IG are stored for being utilized by the microprocessor in conjunction with the program that controls the microprocessor. The zero power random access memory is bidirectional, that is, information may be provided to the data input terminals 00 through 07 thereof in conjunction with the write signal $\overline{WR}$ which is provided by the microprocessor U107 to the $\overline{WE}$ input terminal of the zero power RAM U101 and as a function of the address information supplied by the address bus ADR (14:0) which supplies information to the address terminals A0 through A10 of the zero power RAM U101. Furthermore, this action is utilized in conjunction with the chip select signal CS1 being supplied to the chip enable terminal $\overline{CE}$ of memory chip U101 as provided by the appropriate manipulation of the chip select circuit U108. In other operations and in a like manner depending upon address information and that part of the duty cycle in which the microprocessor U107 is residing, the information stored within the zero power random access memory U101 may be read out by actuation of the read signal $\overline{RD}$ as it is provided to the input terminal $\overline{OE}$ for the zero power RAM U101.

There are provided input and output ports which interconnect with the bus DATA (7:0) in a manner to be described hereinafter. PORT 0 which is an input port and which is designated U402 is addressed by a read signal $\overline{RD}$ and the chip select signal CS2. This port is interconnected with the pushbuttons SW401, SW402, SW403, SW404, and SW405 at input terminals 2D, 4D, 5D, 3D, and 1D, respectively, of the input port chip U402. In addition, terminal 7D of PORT 0 is interconnected with output terminal E2 of an opto-coupler U301 which is interconnected with an incomplete sequence circuit IC which will be described in greater detail hereinafter.

The incomplete sequence circuit IC provides a low level AC sine wave signal between the K2 and A2 input terminals of the optocoupler U301. This signal is converted to a low level square wave voltage signal across the resistive element R417. The latter signal is designated ACT1. The INCOMPLETE SEQUENCE input signal is an AC signal of 120 volts magnitude which may be provided exists at the input of the incomplete sequence circuit IC by an auxiliary relay on the contactor 24. When the main contacts of contactor 24 are closed, the auxiliary relay provides the 120 volt AC signal to the incomplete sequence circuit IC. The incomplete sequence circuit IC includes a regulator device PTC operating in conjunction with a "T" filter comprising resistors R309, R311 and capacitive element C313. The output of the filter is connected across a diode CR308 and a burden resistor R313. The 120 volt AC INCOMPLETE SEQUENCE signal is thus filtered and reduced and provided as a low level highly-filtered input between the A2 and K2 input terminals of the opto-coupler U301. When the microprocessor U107 selects PORT 0 data is transferred from the input terminals of PORT 0 to the 1Q through 7Q output terminals thereof for being supplied as input data for the microprocessor U107. This data may be transferred through the microprocessor U107 to various memories for storage.

There is provided an output port U106 which writes output information which is delivered to the 1D through 8D input terminals thereof from the data bus DATA (7:0). Output port U106 is selected by chip select signal $\overline{CS3}$ and by the actuation of the write signal $\overline{WR}$. The output port 1 represented by chip U106 may be reset by the reset signal RESET. In a like manner, three other output ports designated DEPORT 0, DEPORT 1 and DEPORT 2 represented by chips U404, U405 and U406, respectively, are interconnected with the data bus DATA (7:0) and are selected sequentially by the utilization of the write signal $\overline{WR}$ and the chip select signals $\overline{CS4}$, $\overline{CS5}$, $\overline{CS6}$, respectively for performing a display function in a manner which will be described hereinafter.

Data concerning the status of the current flowing in the conductors monitored by the relay system 10 and the temperatures of various resistance temperature detectors (RTD's) are provided as inputs in two separate places for the microprocessor U107. The resistance temperature data data is provided by way of an RTD port which is represented by terminals 20, 21 and 22 of the terminal board TB2. The RTD PORT is interconnected by way of a signal conditioning and control system SCS with the terminals T0 and T1 of the microprocessor U107. Data is supplied through the signal conditioning system SCS by way of the data line DATA interconnected with the terminal board TB2 at the terminal 21 and the T1 input terminal of the microprocessor U107. The data is provided with the aid of a strobe output signal STROBE provided at the terminal T0 on the microprocessor U107. Multiple resistance temperature detector data are multiplexed and provided as sequential data by way of the data line DATA of the RTD port associated with terminal board TB2. This information is utilized in a thermal model to be described hereinafter which is stored within the memory U102 and utilized in conjunction with the microprocessor U107 in conjunction with sampled line current information and time to provide a representation of the $I^2t$ curve, a curve associated with a prior art electromechanical circuit breaker. The heating affect associated with the physical conductors and frames and support members of the motor being monitored or protected by the relay 10 form a basis for the thermal model.

In the preferred embodiment of the invention, the line currents are provided at the previously described IOUT output terminal of the custom chip U201. This current is converted to a voltage by way of the resistive element R214 and R215 which are interconnected with the terminal IOUT. This voltage is provided to a buffer operational amplifier U204, the output of which is connected to the VIN+ input of an analog to digital converter U203. The analog input of the A to D converter U203 is converted to an eight bit digital value and provided on the eight parallel lines connected to the terminals D0 through D7 of the analog to digital converter U203. Analog information is supplied or written into the input terminal VIN+ as a function of the presence of the write signal $\overline{WR1}$ as found at input terminal $\overline{WR}$ of the analog to digital converter U203. Digital output information is provided to the output terminals D0 through D7 as a function of a read signal $\overline{RD1}$ impinging upon the read input terminal RD of the analog to digital converter U203. Since the analog to digital converter U203 is an eight bit analog to digital converter, the multiranging system described previously with respect to the custom chip U201 is utilized so that the output of the analog to digital converter is not saturated over the wide dynamic range of the input currents IA, IB, and IC. The digital output information on the terminals D0 through D7 of the analog to digital converter U203 is interconnected with a buffer latch U202 at the input terminals 1D through 8D thereof, respectively. This information is then passed through the buffer latch U202 to the output terminals 1Q through 8Q thereof, respectively, and thence to the previously-described data line DATA (7:0). The information is read out of the buffer latch U202 in conjunction with the presence of the chip select signal $\overline{CS0}$ and the read signal $\overline{RD}$.

The previously-described light-emitting diodes LED 401 through 404 representing the "ALARM", "TRIP", "RUN" and "PROGRAM" function are interconnected at the anodes thereof with similar current limiting resistors RP402, the other sides of which are connected to the +V power supply terminal. All of the anodes of the aforementioned diodes are interconnected by way of a diode driver U403 with the output terminals 5Q, 6Q, 7Q and 8Q of the output port device designated DEPORT 2, otherwise designated U406. In conjunction with the data present on the 5D, 6D, 7D and 8D terminals of the chip U406, and in conjunction with the presence of the chip select signal $\overline{CS6}$ and the write signal $\overline{WR}$, the various light-emitting diodes U401 through U04 may be illuminated. This illumination is in conjunction with information provided and sensed by the microprocessor U107.

As was described previously with respect to the front panel 14, there were provided read-out devices LD501 through LD504. Each of the read-out devices LD501 through LD504 represent dual 15-segment LED displays, two for each chip. By examining the functional block designated LD504, it can be seen that which of the two LED read-outs are to be illuminated is a function of the cathode select signals C8 and C7 provided on the cathode output terminals C2 and C1, respectively. Each of the read-outs 30 and 32 have 15 strategically arranged light-emitting diodes which can be energized in predetermined sequences to produce any alphanumeric function 0 through 9 and A through Z. In addition, a decimal point is provided as the 15th segment. The anode portions of the light emitting segments are designated Aa through Pa for the 14 alphanumeric segments and Dp for the decimal point. The terminals Aa through Pa and Dp represent the anodes of the light-emitting diodes whereas the cathodes c1 c2 represent the common cathodes thereof. Said in another way, all of the cathodes for the fifteen light-emitting diode sections for the display portion 30 of chip LD 504 are tied together at C1 whereas all of the anodes are connected to separate terminals Aa through Pa and Dp. The light-emitting diode arrangements LD501, LD502, and LD503 are similarly arranged. Which of the eight light-emitting diodes is chosen for use is a function of the control signal C1 through C8 being applied to the appropriate common cathodes in a manner to be described hereinafter. There is provided a multiplexer U407 having digital input terminals A, B, C and D connected respectively to the 1Q through 4Q output terminals of the DEPORT 2 chip U406. Depending upon the data simultaneously impressed across the input terminals A, B, C, D of the multiplexer U407, the gate of a MOSFET transistor MO1 through MO8 is energized from the multiplexed output terminals 1 through 8 of the multiplexer U407. The drains of the aforementioned MOSFET transistors MO1 through MO8 are grounded and the sources thereof are connected to the light-emitting diode arrays LD501 through LD504 to supply the cathode select control signals C1 through C8, respectively. Consequently, the microprocessor U107 can select which of the read-out devices LD501–LD504 is to be actuated at any instant of time. It is presumed in the preferred embodiment of the invention that the LEDs will be actuated or enabled sequentially rather than in parallel. However, the speed of operation and the retentivity or residual affect of the light-emitting diodes is such that even though the devices in question are sequentially enabled, all of the devices appear to be illuminated at one time. Once an LED is selected by the previously-described operation, then the planned illumination of the appropriate light-emitting diodes is controlled by diode driver DAa through DPa. All of the diode drivers in the preferred embodiment of the invention may be the same and are essentially similar to that depicted with respect to diode driver DAa. Diode Drive DAa corresponds to the anode of the light-emitting diode segment Aa shown in LD504. A transistor Q400 is interconnected at the emitter thereof in each case with the +V voltage supply terminal and at the collector thereof through a resistive element R400 to a data bus DISPA (15.1) whereupon the other side of the resistor in each case is interconnected with the appropriate anode of the light-emitting diode segment in question. In the event that any character segment is to be illuminated, the 7Q output terminal is high. There is provided a similar device designated DEPORT 0 which is also designated as chip U404. The 1D through 8D input terminals of the DEPORT device U404 are interconnected to the 1Q through 8Q output terminals thereof, respectfully, when the clock input CD0 is periodically pulsed or actuated. The 1D through 7D input terminals of the device DEPORT 1 U405 are connected to the 1Q through 7Q output terminals thereof, respectively, when the clock input CD1 is periodically pulsed or actuated. The 1Q through 8Q output terminals of the device DEPORT 0 are connected through resistive elements RP403 to the base of the aforementioned transistor Q400 in each of the anode drivers DAa through DHa, respectively. In a like manner, the output terminals 1Q through 6Q of the device DEPORT 1 are connected similarly to the light emitting diode drivers DJa through DPa, respectively. It can be seen, therefore, that the disposition of the actuating digital signals on the output terminals 1Q through 8Q of the device DEPORT 0 and 1Q through 6Q of the device DEPORT 1 choose which of the light-emitting diodes are to be energized and consequently which message or symbol is to be displayed in the Display 14 at any instant of time. Typically, two types of signals are displayed upon the eight segment display devices represented by the modules LD501, LD502, LD503, and LD504. In one case, a standard display arrangement is utilized which does not constitute part of the present invention. In another case, a "HELP" message is utilized in a manner which will be described hereinafter.

In many instances, it is desired to cause the motor contactor or starter 24 controlled by the aforementioned relay 10 to trip, or for a warning to be provided, in the event that any one of the phase currents IA, IB, or IC exhibits undesirable characteristics. For instance, a jam situation may exist, in which case it is desirable to trip the contactor. In another situation where the monitored current is at some user programmable value between zero and 90% of load current, an underload condition may exist for which it is desirable to provide a trip. These situations and others are manifested in changes in the RMS value of are the load current. In other situations, a trip may be issued as a function of the square of the effective phase current multiplied by time. This provides the well-known I$^2$t function. This function is heat-related. Still, other protective functions respond to RMS single-phase current. Regardless of which of these values is to be utilized, it is necessary to sample the line current at a reliable sampling frequency and to provide digital information associated with the latter-mentioned samples to the microprocessor U107 for the purposes of providing data for utilization in appropriate calculations. The line current is sampled, monitored, and converted to digital form in a manner described previously. It is well known that the average value of electrical current IRMS and the effective value of electrical current IEFF for an alternating current system is related to the positive and negative symmetrical components IP, and IN, respectively of the AC line currents. The relationship for the average (RMS) current is shown in equation (1). The relationship for the effective current is shown in equation (2):

$$IRMS^2 = IP^2 + IN^2 \tag{1}$$

$$IEFF^2 = IP^2 + 6IN^2 \tag{2}$$

By comparing equations (1) and (2), it can be seen that the components thereof are essentially the same except for the heavier weighting of the negative symmetrical component IN in equation (2).

Figure 5:
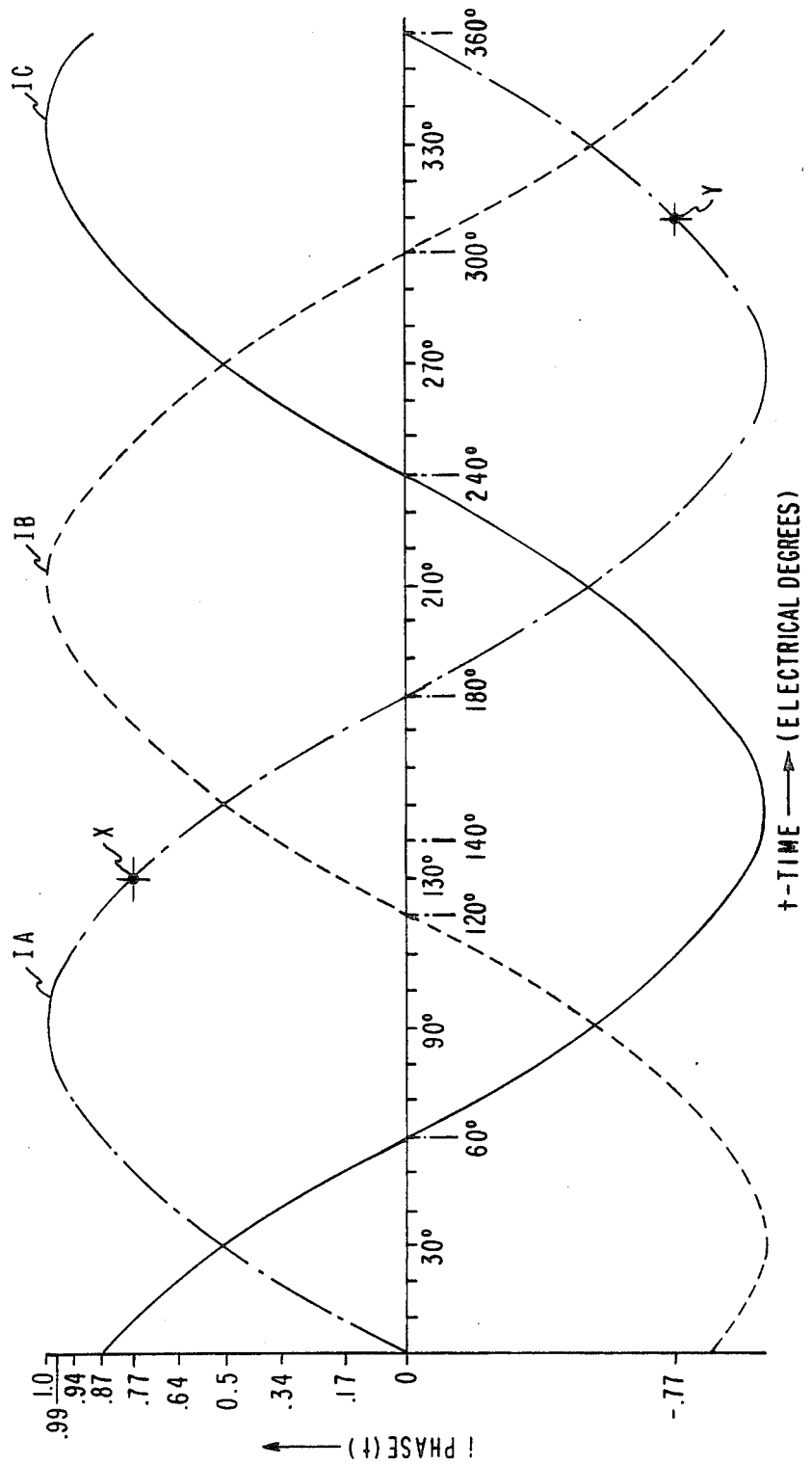
FIG. 5 shows normalized three phased line current iPHASE(t) measured against time in electrical degrees.

Referring now to FIG. 5, the instantaneous values of phase current as a function of time for three balanced phase currents IA, IB, and IC are depicted. Current IA is phase-shifted from current IB by 120° and current IB is phase-shifted from current IC by 120°. It follows that current IC is also phase-shifted from current IA by 120°. In the preferred embodiment of the invention, each of the phase currents, IA, IB, and IC, is sampled once every 10° (electrical) over a complete current cycle, i.e. 360° (electrical). The instantaneous values are digitized and stored in the zero power RAM U101 for subsequent use by the microcomputer U107 for providing protection. All of the data are sampled before the protective functions involving the sampled data are begun. Since 36 samples are taken on each phase, and since there are three phases, 108 digital numbers are stored in memory in a convenient manner. The 108 pieces of data represent the three-phase currents IA, IB, and IC over one cycle. Equation (3) shows equation (1) repeated in a form which takes into account that individual digital representations of the positive sequence component currents IP(W) and negative sequence component current IN(W) at 10° increments over 360° are to be added or accumulated:

$$IRMS^2 = \Sigma IP(W)^2 + \Sigma IN(W)^2 \tag{3}$$

In the equation (3), W changes in increments of 10°—from 0° to 350°—providing 36 values for IP and 36 values for IN. All of the IP values are individually squared and then added together or accumulated, and all of the IN values are individually squared and then added together or accumulated. The result is a value which represents the square of the RMS value of all three-phase currents IRMS$^2$. The well-known relationship for converting phase currents into positive and negative sequence component currents is shown in equations (4) and (5):

$$IP(W) = \frac{IA(W) + IB(W + 120°) + IC(W + 240°)}{3} \tag{4}$$

$$IN(W) = \frac{IA(W) + IB(W - 120°) + IC(W - 240°)}{3} \tag{5}$$

where W = 0°, 10°, 20° ... 350°. In accordance with the present invention, sets or groupings of three parts of positive sequence components current as set forth in equations (6), (7), and (8), which are offset by 120° (electrical) from each other, provide information which is very useful in improving the efficiency of the interplay between the microprocessor U107 and zero power random access memory U101:

$$IP(0°) = \frac{IA(0°) + IB(120°) + IC(240°)}{3} \tag{6}$$

$$IP(120°) = \frac{IA(120°) + IB(240°) + IC(0°)}{3} \tag{7}$$

$$IP(240°) = \frac{IA(240°) + IB(0°) + IC(120°)}{3} \tag{8}$$

In a like manner, equations (9), (10), and (11) show a similar set of negative sequence components:

$$IN(0°) = \frac{IA(0°) + IB(-120°) + IC(-240°)}{3} \tag{9}$$

$$IN(120°) = \frac{(IA(120°) + IB(0°) + IC(-120°)}{3} \quad (10)$$

$$IN(240°) = \frac{IA(240°) + IB(120°) + IC(0°)}{3} \quad (11)$$

The interplay between the three sets of positive sequence components set forth in equations (6), (7), and (8) will become apparent hereinafter. The same is true for the negative sequence components set for in equations (9), (10), and (11).

Figure 6:
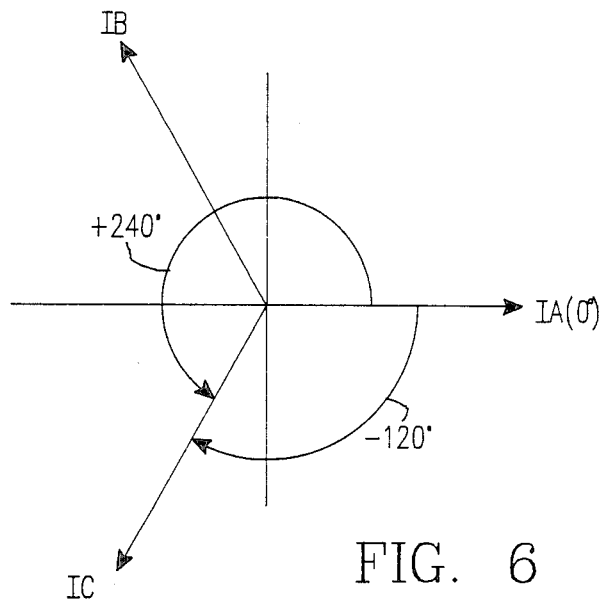
FIG. 6 shows a typical vector relationship between the line currents of FIG. 5.

Referring now to FIG. 6 and equations (12), (13), and (14), equivalents for phase currents are set forth:

$$IC(-120°) = IC(+240°) \quad (12)$$

$$IC(-240°) = IC(+120°) \quad (13)$$

$$IB(-120°) = IB(+240°) \quad (14)$$

It is clear, for example, by examining equation (12) that the current IC at $-120°$ is the same as the current IC at $+240°$. This is not only true for all the phase currents depicted in terms of a negative angle W in equations (9), (10), and (11), but it is also true for all phase currents set forth with a negative angle. Said in another way, any current which can be represented by a negative angle can also be represented by a positive angle which may, and usually is, different than the negative angle. Such being the case, all of the phase currents in equations (9) and (10), for example, which are set forth in terms of a negative angle, may be replaced by the equivalents set forth in equations (12), (13), and (14), for example, which utilize positive angles. It can be seen, therefore, that equations (9), (10), and (11) may be rewritten as equations (15), (16), and (17), respectively, merely by using the identities or equivalents set forth in equations (12), (13), and (14):

$$IN(0°) = \frac{IA(0°) + IB(240°) + IC(120°)}{3} \quad (15)$$

$$IN(120°) = \frac{IA(120°) + IB(0°) + IC(240°)}{3} \quad (16)$$

$$IN(240°) = \frac{IA(240°) + IB(120°) + IC(0°)}{3} \quad (17)$$

Comparing equations (6), (7), and (8) as a group with equations (15), (16), and (17) leads to the following observation: All nine phase currents set forth as a function of a positive angle in equations (6), (7), and (8) are the same as the nine phase currents set forth with a positive angle in equations (15), (16), and (17). However, in both sets of equations the nine common values are utilized in different orders or arrangements. This means that once the nine phase currents IA(0°), IB(120°), IC(240°), IA(120°), IB(240°), IC(0°), IA(240°), IB(0°), and IC(120°) are known, all the values IP(0°), IP(120°), and IP(240°), IN(0°), IN(120°), and IN(240°) can be calculated. With that in mind, it becomes obvious that if the zero power random access memory U101 is properly arranged, significant amounts of positive and negative sequence current information can be gathered from a relatively small number of memory locations. Furthermore, if these memory locations are closely spaced, then the foregoing amount of information can be ascertained, with a minimum amount of movement from one portion of the random access memory U101 to another portion thereof. The efficiency is enhanced even further by locating memory locations such that the information may be taken from memory merely by indexing the memory address by one memory location during each operation. This is made possible by making the appropriate memory locations contiguous within the memory. A memory map which represents the foregoing is set forth in FIG. 7. FIG. 7 shows 108 memory locations numbered consecutively from "0" to "107". The 108 memory locations are arranged in nine columns and 12 rows. The columns are designated from left to right in FIG. 7 as IA(W), IB(W), IC(W), IA(W+120°), IB(W+120°), IC(W+120°), IA(W+240°), IB(W+240°), and IC(W+240°). The rows depict values of W in 10° increments starting with 0° and ending with 110°. It will be noted that the top row, i.e., the row containing memory locations "0" through "8" which corresponds to W=0° contain the nine phase current components which make up equations (6), (7), and (8) as a group, and (15), (16), and (17) as a group. Consequently, by withdrawing the data in memory locations "0" through "8", sequentially, and then operating upon that data at least six symmetrical component values can be extracted—three positive symmetrical components and three negative symmetrical components. Referring to FIG. 8, within the microprocessor U107 six memory regions are set aside as intermediate accumulators, 202, 204, 206, 208, 210, and 212 for receiving the phase current information stored in memory locations in any one row to form the symmetrical components IP(W), IP(W+120°), IP(W+240°), IN(W), IN(W+120°), IP(W+240°), IN(W), IN(W+120°), and IN(W+240°), respectively. The relationship between the nine phase current components associated with equations (6), (7), and (8), (15), (16), and (17) for the case W=0°, 120°, and 240° works equally well for any of the other values of W and for the row in the memory map of FIG. 7 associated therewith. For the purpose of example, each of the memory locations "0" through "107" of the memory map or memory representation set forth in FIG. 7 contains a digital number representative of an appropriate instantaneous current sample of the three-phase normalized currents IA, IB, and IC of FIG. 5. As can be seen by examining memory location "0" of FIG. 7 and the instantaneous value of current IA of FIG. 5 at 0°, the value in memory location 0 is zero. The instantaneous value of current IA at 140° depicted in FIG. 7 at memory location "21" is 0.64. All 108 memory locations are filled in a similar manner.

Figure 9:
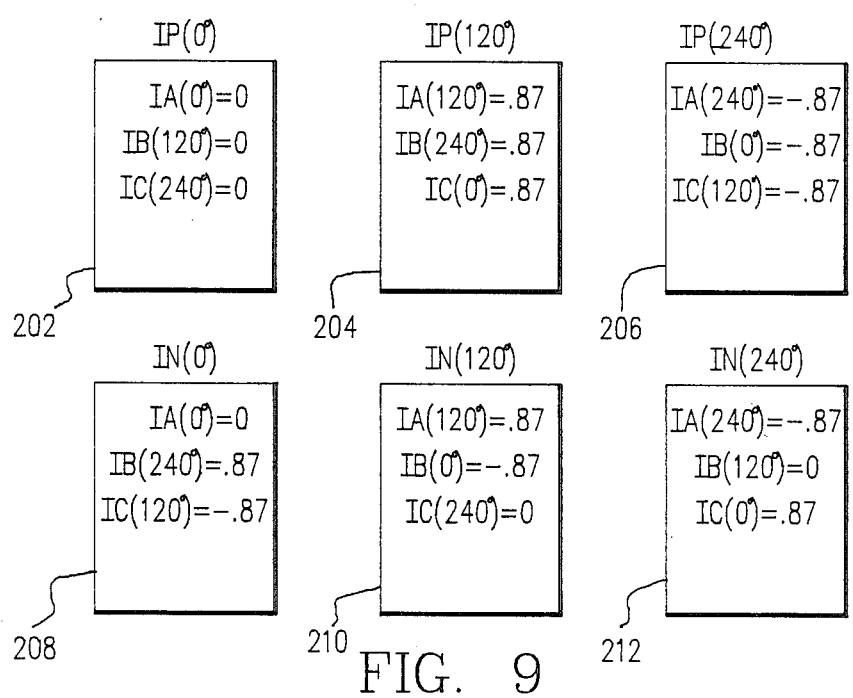
FIG. 9 shows the accumulators of FIG. 8 in a partially loaded state.
Figure 10:
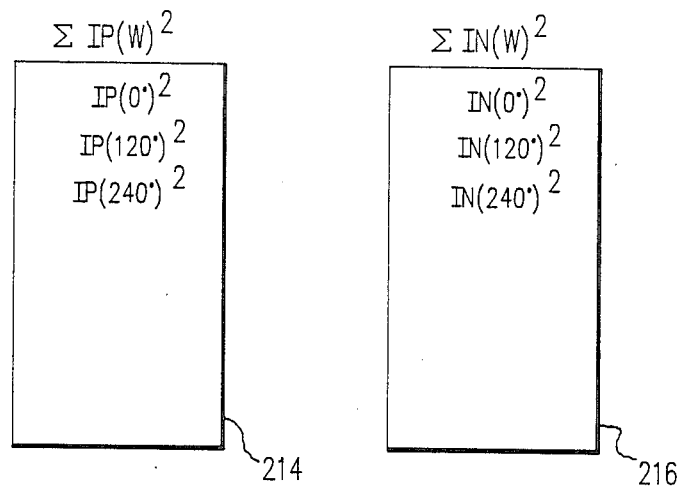
FIG. 10 shows positive and negative sequence total component accumulators in a partially loaded form.

The arrangement of FIG. 7 and the numbers which are stored in the memory locations thereof presume that in at least one embodiment of the invention the positive and negative values of the phase currents IA, IB and IC may be sensed, transferred, and stored. However, in a preferred embodiment of the invention, the positive values of phase current are not sensed. In such a case, as will become more apparent hereinafter, the positive phase current waveform is reconstructed from the available negative phase current information. However, in the case where negative values of current are stored as is set forth with respect to FIG. 7, data is extracted from the first row corresponding to memory location "0" through "8" and placed in the intermediate accumulators 202, 204, 206, 208, 210, and 212 in accordance with equations (6), (7), (8), (15), (16), and (17). In accordance with the arrangement shown in an example set forth with respect to FIG. 9, all of the phase current components associated with equation (6) are set forth in accumulator 202, all of the phase currents associated with equation (7) are set forth in accumulator 204, and so on for equations (8), (15), (16), and (17), and appropriate accumulators 206, 208, 210, 212, respectively. The intermediate accumulators 202, 204, 206, 208, 210, and 212 depicted in FIG. 9 perform the appropriate additions to provide a single number which is subsequently divided by 3 and squared for loading into a positive component accumulator 214 which sums all of the 36 values of the positive sequence components gathered as the result of the 10° sampling intervals over one line cycle. In a like manner, the same thing is done with accumulators 208, 210, and 212 for the total negative sequence component accumulator 216. Accumulators 214 and 215, which may also be formed at memory regions in the zero power RAM U101, are shown in FIG. 10. As a result of the aforementioned example associated with the $W=0°$ row of the memory map depicted in FIG. 7, positive sequence accumulator 214 has stored therein three of the necessary 36 component values; namely, $IP(0°)^2$, $IP(120°)^2$, and $IP(240°)^2$ for total accumulation. In a like manner, the negative sequence accumulator 216 includes three component values: $IN(0°)^2$, $IN(120°)^2$, and $IN(240°)^2$. The three entries in positive accumulator 214 came from the intermediate accumulators 202, 204, and 206, respectively, and the entries for the negative sequence accumulator 216 came from intermediate accumulators 208, 210, and 212.

Figure 12:
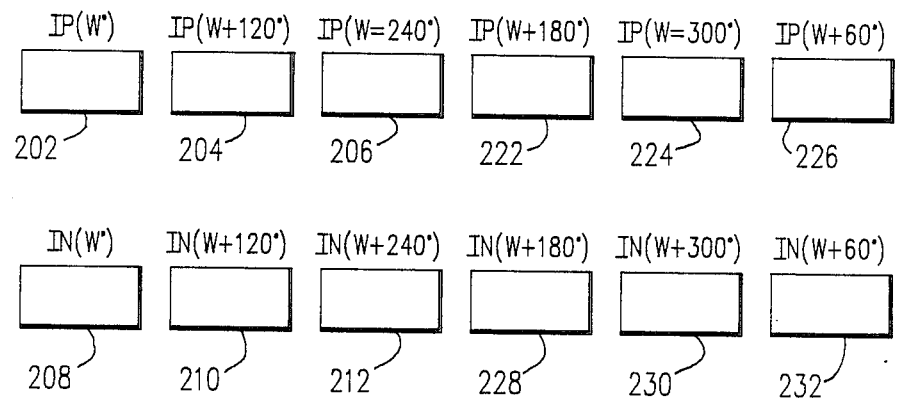
FIG. 12 shows a larger set of intermediate accumulators than shown in FIG. 8 for enlarged capability.

As was mentioned previously in the preferred embodiment of the invention, two things occur which cause the memory maps to be different from that associated with FIG. 7. First, no positive value of phase current sampled by custom chip U201 and then transmitted to the memory; and second, those negative values of phase current which are sampled and transferred to the memory are depicted in the memory as positive values. By comparing the memory map of FIG. 7 with the memory map of FIG. 11 on a location-by-location basis, it can be seen that everywhere a positive value of phase current is found in a location of FIG. 7, a zero is found in the corresponding location of FIG. 11. Everywhere a negative value of phase current is found in a location in FIG. 7, a corresponding equal positive value of phase current is found in the corresponding location of FIG. 11. In order for the memory map of FIG. 11 to be useful, the positive values of phase current must be reconstructed somehow and the algebraic sign on those values of phase current shown in the memory locations must be changed. As an aid in performing the aforementioned conversions, it is to be understood that any positive finite value appearing in a memory location of FIG. 11 can be replaced by its negative equivalent. In order to reconstruct the positive values for phase current, reference may be had to FIG. 5 again where it can be seen that for symmetrical phase current waves a positive value is always equal to the negative of the value found 180° displaced from the positive value. For example, at 130° the instantaneous wave IA shown at point X depicts a phase current of 0.77. At point Y on the same wave which is 180° displaced from point X, minus 0.77, is found. Using this relationship, the positive portion of all of the points on curve IA between 0° and 180° on FIG. 7 can be reconstructed by utilizing those points which are 180° phase shifted on curve IA with an appropriate sign reversal. Fortunately, the matrix of memory locations associated with FIG. 11, for example, is such that the 180° phase-shifted values can always be found in another row of the matrix. At memory location "9", for example, where the current IA(10) should be stored, a zero is found instead of the value 0.17 is the correct value. However, by finding the memory location corresponding to IA(190°), i.e., $W=(180°+10°)$, the correct value should be found. This information is found in memory location "66". And, in fact, an examination of memory location "66" in FIG. 11 shows the value 0.17. Once this has been established, it is easy to see that all of the 180° offset values for the $W=10°$ row of FIG. 11 can be found in the $W=70°$ row of FIG. 11. And consequently, by extracting data from two rows at a time, now, rather than one, the missing positive portion of a wave can be reconstructed. As an extra benefit, it is easily determined that since two separate rows must be utilized to reconstruct the positive portion of the missing wave, twice as much information is available for also determining positive and negative symmetrical components. Referring to FIG. 12, intermediate accumulators 222, 224, and 226 for the three symmetrical current components $IP(W+180°)$, $IP(W+300°)$, and $IP(W+60°)$ are added and three intermediate accumulators 228, 230, and 232 for negative symmetrical components $IN(W+180°)$, $IN(W+300°)$, and $IN(W+60°)$ respectively are also added.

Figure 13:
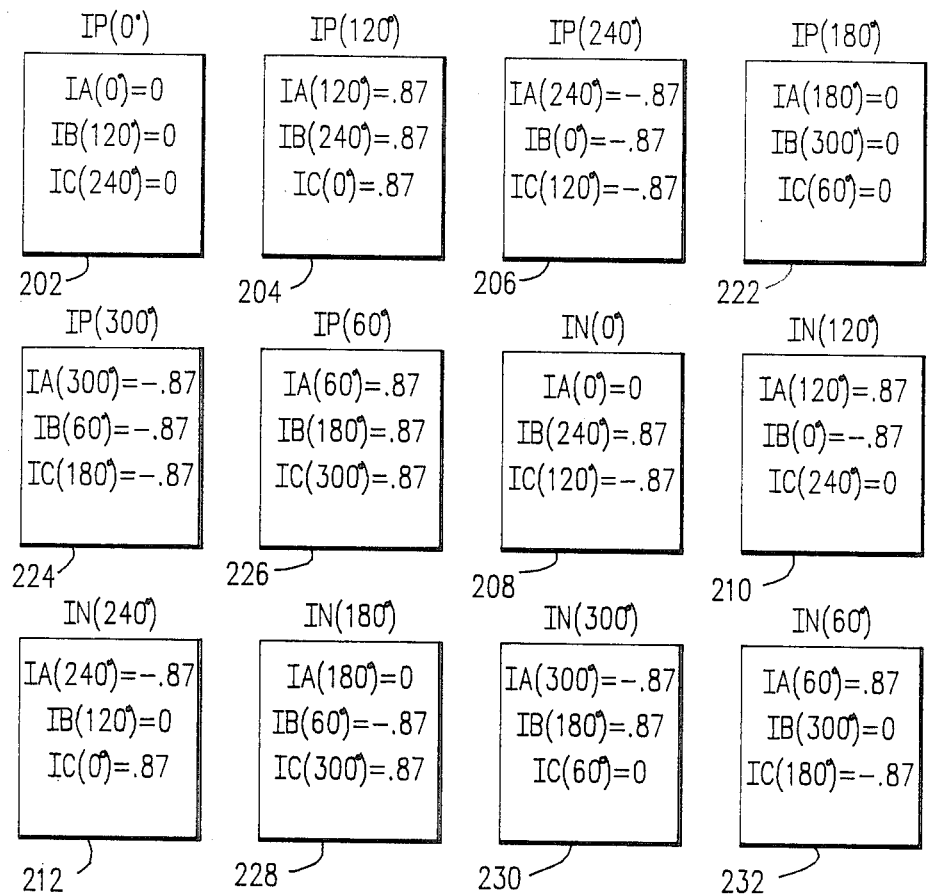
FIG. 13 shows the accumulators of FIG. 12 in a partially loaded state.
Figure 14:
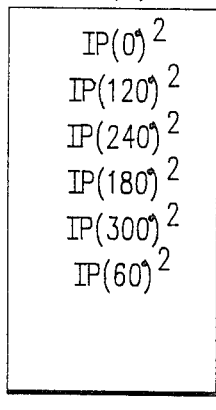
FIG. 14 shows the total positive sequence symmetrical component accumulator of FIG. 10 in a further loaded state.
Figure 15:
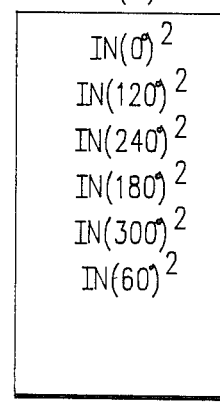
FIG. 15 shows the total negative sequence symmetrical component accumulator of FIG. 10 in a further loaded state.

Referring now to FIG. 13, the accumulators set forth in FIG. 12 are depicted once again for the cases $W=0°$ and $W=60°$. Corresponding data is extracted simultaneously in a contiguous manner from each row on a column-by-column basis. It is to be understood, however, that the data extracted in contiguous manner from the row represented by $W=60°$ is offset from the data extracted by the row represented by $W=0°$. The data is extracted simultaneously in accordance with the following memory location pairs: "0-57", "1-58", "2-59", "3-60", "4-61", "5-62", "6-54", "7-55", and "8-56". As each pair of data is extracted, an internal software comparator within the microprocessor U107 looks for the highest value, substitutes that for the lowest value, changes the sign of the highest value, and places both numbers in the appropriate accumulators according to the arrangements set forth with the example depicted with respect to FIG. 13. After each pair of rows has been manipulated in this way and the intermediate accumulators associated with FIG. 13 have been filled, the positive and negative accumulators 214 and 216 are loaded in the manner described previously except that this time six values are loaded on each pass rather than merely three values. A loading arrangement associated with the example of FIG. 13 is shown in FIGS. 14 and 15.

After all of the rows associated with the memory matrix of FIG. 11 have been manipulated with appropriate positive wave reconstruction and sign reversal, and after both accumulators 214 and 216 have been filled, the accumulators 214 and 216 are sampled by the microprocessor U107 in accordance with equation (3), to provide a representation for the average value of the three-phase currents in one line cycle. This is identified as $IRMS^2$. In a like manner, $IEFF^2$ is calculated by multiplying the output of accumulator 216 by a factor of 6.

Figure 16:
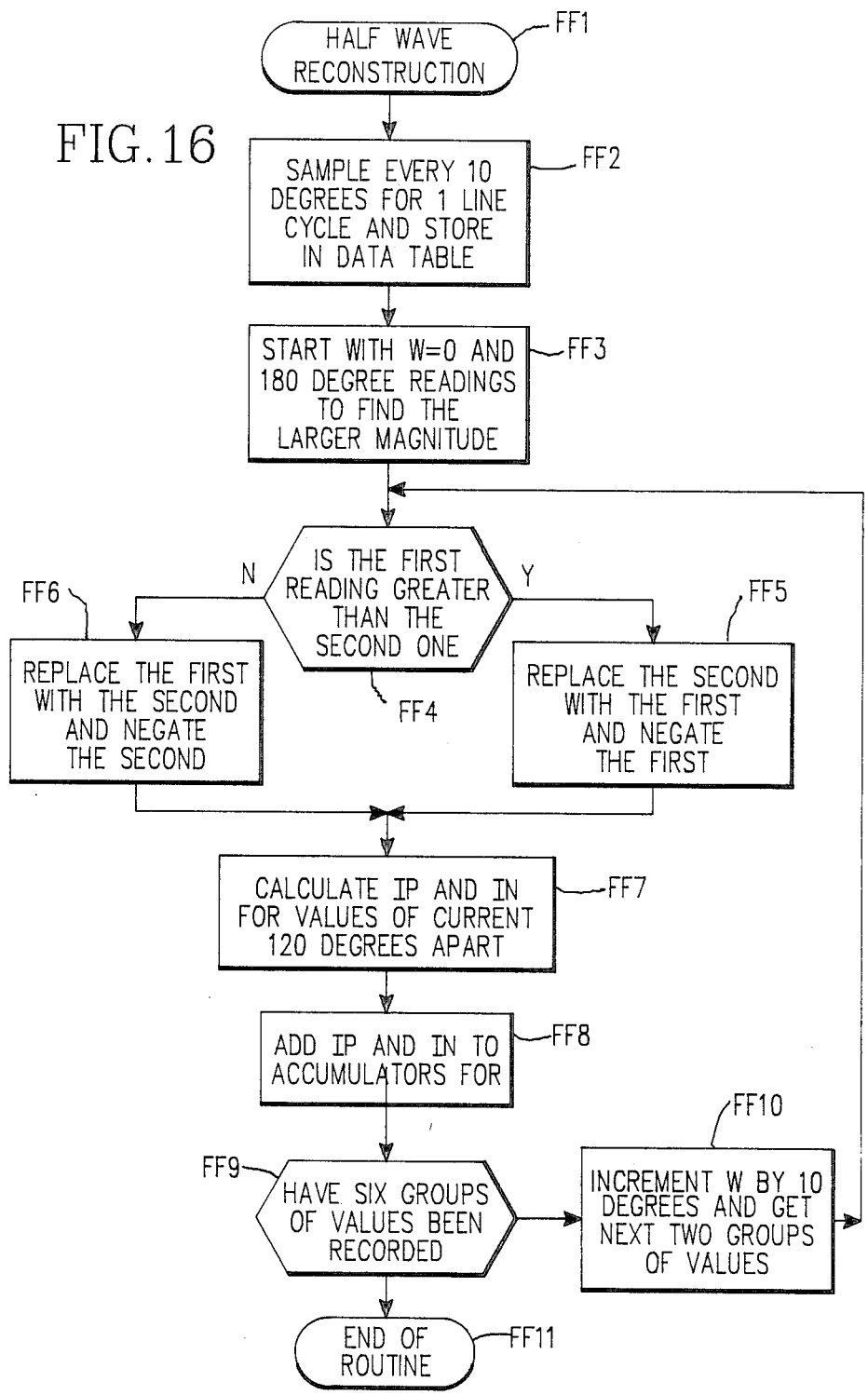
FIG. 16 shows the "HALF WAVE RECONSTRUCTION" algorithm.

The foregoing is accomplished by way of reference to the algorithm set forth in block diagram form in FIG. 16. In the example associated with FIG. 13, positive sequence components $IP(180°)$, $IP(300°)$, $IP(60°)$, and the negative sequence components $IN(180°)$, $IN(300°)$, and IN(60°) are determined according to equations (18) through (23), respectively:

$$IP(180°) = \frac{IA(180°) + IB(300°) + IC(60°)}{3} \quad (18)$$

$$IP(300°) = \frac{IA(300°) + IB(60°) + IC(180°)}{3} \quad (19)$$

$$IP(60°) = \frac{IA(60°) + IB(180°) + IC(300°)}{3} \quad (20)$$

$$IN(180°) = \frac{IA(180°) + IB(60°) + IC(300°)}{3} \quad (21)$$

$$IN(300°) = \frac{IA(300°) + IB(180°) + IC(60°)}{3} \quad (22)$$

$$IN(60°) = \frac{IA(60°) + IB(300°) + IC(180°)}{3} \quad (23)$$

The aforementioned is accomplished by the HALF WAVE RECONSTRUCTION algorithm FF1 of FIG. 16. The microprocessor U107 instructs the chip U201 to sample every 10° for one line cycle and store the results in the data table of FIG. 11 in accordance with FF2. Then, in accordance with FF3, the microprocessor starts with the 0° and 180° readings to find the larger magnitude. Then in accordance with FF4, the microprocessor asks "Is the first reading greater than the second one?". If the answer to that question is "yes", then in accordance with FF5, the microprocessor replaces the second with the first and negates the first. However, if the answer to the question posed in FF4 is "no", then the microprocessor replaces the first with the second and negates the second. Then, in accordance with FF7, the microprocessor calculates IP and IN for values of current which are 120° apart as is depicted with respect to FIG. 13, for example, for the special case where W=0. Next, in accordance with FF8, the values calculated in accordance with FF7 are added to accumulators such as depicted at 214 and 216 in FIG. 14. Then, in accordance with FF9, the microprocessor asked the question "Have six groups of values been recorded in each accumulator?". Note that one group represents what is shown in either 214 or 216 in FIG. 14, for example. The next group, for example, would be similar to the value shown in accumulators 214 and 216 of FIG. 14, but incremented upwards by 10°. If the answer to the question posed in FF9 is "no", then in accordance with FF10, the microprocessor increments W by 10° and returns to FF4 to form the second group for adding to the accumulators 214 and 216 of FIG. 14, for example. When the answer to the question posed in FF9 is "yes", then the microprocessor declares that the routine should end. At this time, all of the values necessary to calculate IRMS in accordance with equation 1 or IEFF in accordance with equation 2 is available.

The transition concept associated with the present invention is described. In essence, the microprocessor samples line currents IA, IB and IC 36 times per line cycle for each line in a manner to be described hereafter and stores that information in memory U101. At an appropriate time, the current information for each line is extracted to an accumulator in a manner previously described until 36 entries have been made for representing the 36 sample slices for each electric current line cycle at each line LINE A, LINE B and LINE C. The total value represented in the accumulator is then divided by 36 and the square root taken. The net result is equal to the RMS value of the line current for the line cycle from it was derived. In the preferred embodiment of the invention, when this value reaches an arbitrarily chosen 15% of full load current, the microprocessor U107 in accordance with preprogrammed instructions declares that a start condition has taken place. The microprocessor U107 will then perform other appropriate protective functions over a number of microprocessor duty cycles which may cover a significant number of line cycles for the currents. In a preferred embodiment of the invention, nine line cycles are allowed to expire before the current N checked again to see if it has fallen to a low enough level to allow increased voltage to be placed across the motor windings so that the motor will eventually increase speed to running speed. Therefore, the current is measured again after the appropriately described period of time (equivalent to nine line cycles) has elapsed to allow the in-rush current to dissipate. This means that a current level determines the transition not a transition timer. When the declining current approaches 105% of fuel load current, for example, the microprocessor U107 is alerted to the fact that a transition should take place. The microprocessor then provides an appropriate data output signal to the PORT 1 device U106 at the 3Q output terminal thereof to supply the RLY1 output signal to the "TRANSITION" relay to cause that relay to change state. As that happens the incomplete sequence timer is started, the normally closed contact associated with terminal TRLY1 and TRLY2 designated 1 and 2 on terminal board 1 at the back panel of the relay 10 opens and the normally open relay associated with the terminals TRLY2 and TRLY3 represented by terminals 2 and 3 of terminal board TB1 in the back panel of relay 10 closes. These two terminals are interconnected with appropriate voltage control systems in the low voltage line starter 24 so that the second increment or increased increment of voltage is supplied to the motor being controlled thereby. If a signal has been given to close the relay in the low voltage line starter designated 24, for example, an auxiliary relay will provide the 120 volt AC feedback signal to the incomplete sequence module INC and thence through the optocoupler U301 and the PORT O device U402 to the microprocessor U107 to alert the microprocessor that the contact closing operation for the second stage of voltage application has taken place. At the time that the relay signal RLY1 is supplied, the microprocessor U107 starts and internal clock which is programmable to time out the period of time in which the incomplete sequence signal should be fed back to the module INC. If in that time period, the incomplete sequence signal is not fed back, the microprocessor assumes that the low voltage starter 24 has not closed the second set of contacts as required and thus orders a trip.

If device 24 is considered to be an across the line starter, then the user of the relay system 10 through appropriate manipulation of the front panel buttons alerts the microprocessor U107 to this fact and the microprocessor U107 changes the transition clock time to zero from whatever time it was set at previously. This has the net effect of forcing a transition. With regard to the transition time, in the event that a transition operation has not taken place, the operator or user of the equipment may choose to allow the full voltage to be placed across the motor starter rather than cause a trip operation at the discretion of the user.

Figure 17:
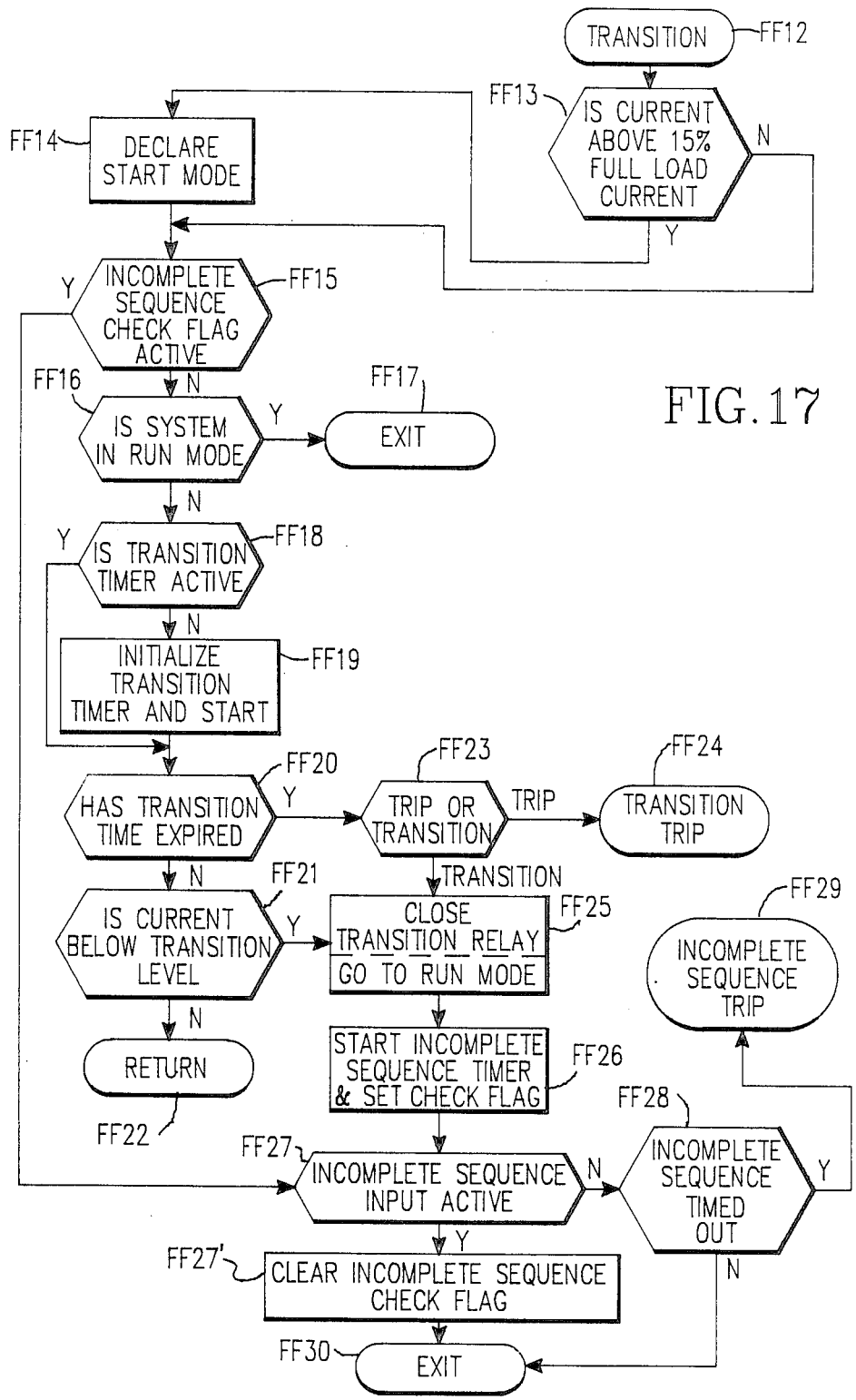
FIG. 17 shows the "TRANSITION" algorithm.

As was mentioned previously, the transition algorithm is described with respect to FIG. 17. The TRAN- SITION ALGORITHM is entered in accordance with FF12. The following question is asked in accordance with FF13, "Is current above 15% full load current?". If the answer to that is no, transition algorithm jumps ahead to FF15. However, if the answer to the question posed in FF13 is yes, the microprocessor will declare a START mode in accordance with FF14. The microprocessor will then check for the presence of an incomplete sequence flag in accordance with FF15. If there is no incomplete system flag, the microprocessor will then determine in accordance with FF16 if the system is in the RUN mode. If it is in the RUN mode, the microprocessor will exit the routine in accordance with FF17. However, if the system is not in the RUN mode, then the microprocessor will ask if the transition timer is active in accordance with FF18. It being recalled that the transition timer is a software timer. If the answer to the question posed in FF18 is no, then the microprocessor will initialize the aforementioned transition timer and issue a START in accordance with FF19. However, if the answer to the question posed in FF18 is yes, then the microprocessor will bypass the FF19 function and determine if the transition time has expired in accordance with FF20. If the answer to the question posed in FF20 is no, then the microprocessor will ask is the current below the transition level according to FF21. If the answer to that question is no, then the microprocessor will exit according to FF22. If the answer posed in FF20 is yes then the microprocessor will ask if there has been a trip or transition in accordance with FF23. If the answer is TRIP then the microprocessor will issue a transition trip in accordance with FF24. However, if the answer to the question posed in FF23 is TRANSITION, then the microprocessor will close the TRANSITION RELAY shown in FIG. 3A and will alert the relay 10 to go into the RUN mode. The microprocessor will then start the incomplete sequence timer in accordance with FF26, set the incomplete timer check flag and then ask in accordance with FF27 whether an incomplete sequence has timed out. If the answer to the question posed in FF15, that is whether there has been an incomplete sequence or not, is yes, then the microprocessor will also ask in accordance with FF27 whether an incomplete sequence input is active. If the answer to the question in FF27 is no, then the microprocessor will ask if the incomplete sequence has timed out according to FF28. In accordance with FF28, if the answer to the question in FF28 is yes, then the microprocessor will issue an incomplete sequence trip in accordance with FF29. However if the answer to the question posed in FF28 is no, or if the answer posed in FF27 is yes, the microprocessor will exit in accordance with FF30.

In accordance with the present invention, it is desirous to know the temperature of the rotor. This temperature is not easily measured directly, and therefore is usually inferred. A well-known model exists, as is set forth in equation (24), for inferring what the temperature of the rotating rotor is:

$$T_{Rn} = T_{R(n-1)} + \frac{\Delta t}{RC} \left( \frac{\Delta T_{LR} (RC) I^2}{I_{LR}^2 \, t_{LR}} + T_S - T_{R(n-1)} \right) \quad (24)$$

where:

$I_{LR}$=locked rotor current, Max 12,000 amperes
$T_{LR}$=time to trip at $I_{LR}$, Max=25 seconds
RC=motor time constant=60 seconds
$\Delta T_{LR}$=locked rotor temperature rise=200° C.
$T_S$=stator temperature in °C.
$T_R$=Rotor temperature (n and n−1 are subsequent values at $\Delta t$ time interval)
$I^2 = IP^2 + 6IN^2$ If the last term in equation (24) is multiplied in both the Numerator and the denominator by a value beta ($\beta$) as is shown in equation (25), the equation remains unchanged.

$$T_{RN} = T_{R(N-1)} + \frac{\beta \Delta t}{\beta RC} \left( \frac{\Delta T_{LR} (RC) I^2}{I_{LR}^2 \, t_{LR}} + T_S - T_{R(N-1)} \right) \quad (25)$$

Beta is a conversion factor expressed in counts per second for converting time to counts. In the preferred embodiment of the invention, beta equals 360 counts per second. The counts delta ($\delta$) is expressed in equation (26):

$$\delta = \beta \Delta t \quad (26)$$

The reason "counts" is chosen as a measure of time is because a program utilized by the microprocessor is actuated six times per line cycle, or roughly 360/sec. That routine thereby provides a reliable clock function which can be utilized to relieve the thermal model from dependency upon fixed time. One keeps track of the counts between calculations of temperature, and utilizes the number of counts which have taken place as a measure of time. This places the calculation of the equation which represents the thermal model on a variable time basis rather than a fixed time basis. The calculation of the thermal model can be further improved by ascertaining a value lambda ($\lambda$) which is a function of temperature but is expressed as current squared times time ($i^2 t$). The convenience associated with this lies in the fact that the microprocessor is set up to calculate current squared from the negative and positive sequence values of three phase current in a manner described previously. Once this value has been determined, it is merely added to the accumulator into which the previous value of rotor heating and the present value of stator heating have been place. Equation (27) shows the thermal model equation expressed in terms of $i^2 t$ rather than temperature:

$$\lambda_{RN} = \lambda_{R(n-1)} - \frac{(\lambda_{R(n-1)} - \lambda_s)\delta}{RC \beta} + \frac{I^2 \delta}{\beta} \quad (27)$$

Equation (28) repeats equation (27) except the constants of equation (27) have been replaced with commencement numerical values.

$$\lambda_{RN} = \lambda_{R(n-1)} - \frac{(\lambda_{R(n-1)} - \lambda_s)\delta}{21600} + \frac{I^2 \delta}{360} \quad (28)$$

As the result of the presence of equation (28), the rotor temperature can be inferred at any time. Generally, the microprocessor U107 operating in conjunction with its memories U101 and U102 begins with the value $\lambda_{R(n-1)}$ which was the previous rotor temperature detected or inferred, subtracts from that a stator heating value represented by the second term on the right of equation (28). The value $\lambda_s$ is determined by reading the resistance temperature detectors RTDs disposed in the stator of the motor being monitored. The RTD data is supplied to the microprocessor U107 at ports T0 and T1 as was described previously from the signal conditioning system SCS T0. There the temperature values are converted to $\lambda_s$. The difference between $\lambda_s$ and the $\lambda_{R(n-1)}$ is divided by 21,600 and multiplied by the total number of counts associated with the interrupt 60 subroutine. This is then supplied to the accumulator in which the previous value $\lambda_{R(n-1)}$ had been stored. Since the newly added term represents rotor cooling, it is subtracted in the latter-mentioned accumulator from the term $\lambda_{R(n-1)}$. The values of squared current stored in the accumulators previously described with respect to the sensing and sampling of line current is then multiplied by the count as described previously and divided by 360 and also added to the previously described accumulator. Since this latter value represents rotor heating its placement in the accumulator generally represents an addition to the value in the accumulator. When all three factors have been added a new value representing rotor heating designated $\lambda Rn$ is determined. Of course $\lambda Rn$ will become $\lambda R(n-1)$ for the next determination of the rotor temperature function. This is simple enough to implement because it is now the present value in the accumulator. The accumulator is formed in memory locations in the zero powered random access memory U101. The value $\lambda Rn$ is representative of the amount of rotor heating which as taken place and it is utilized by the microprocessor U107 in comparison with a setpoint or setpoints which represent those values at which warnings concerning rotor temperature must be issued or at which values a trip must be ordered.

Figure 18:
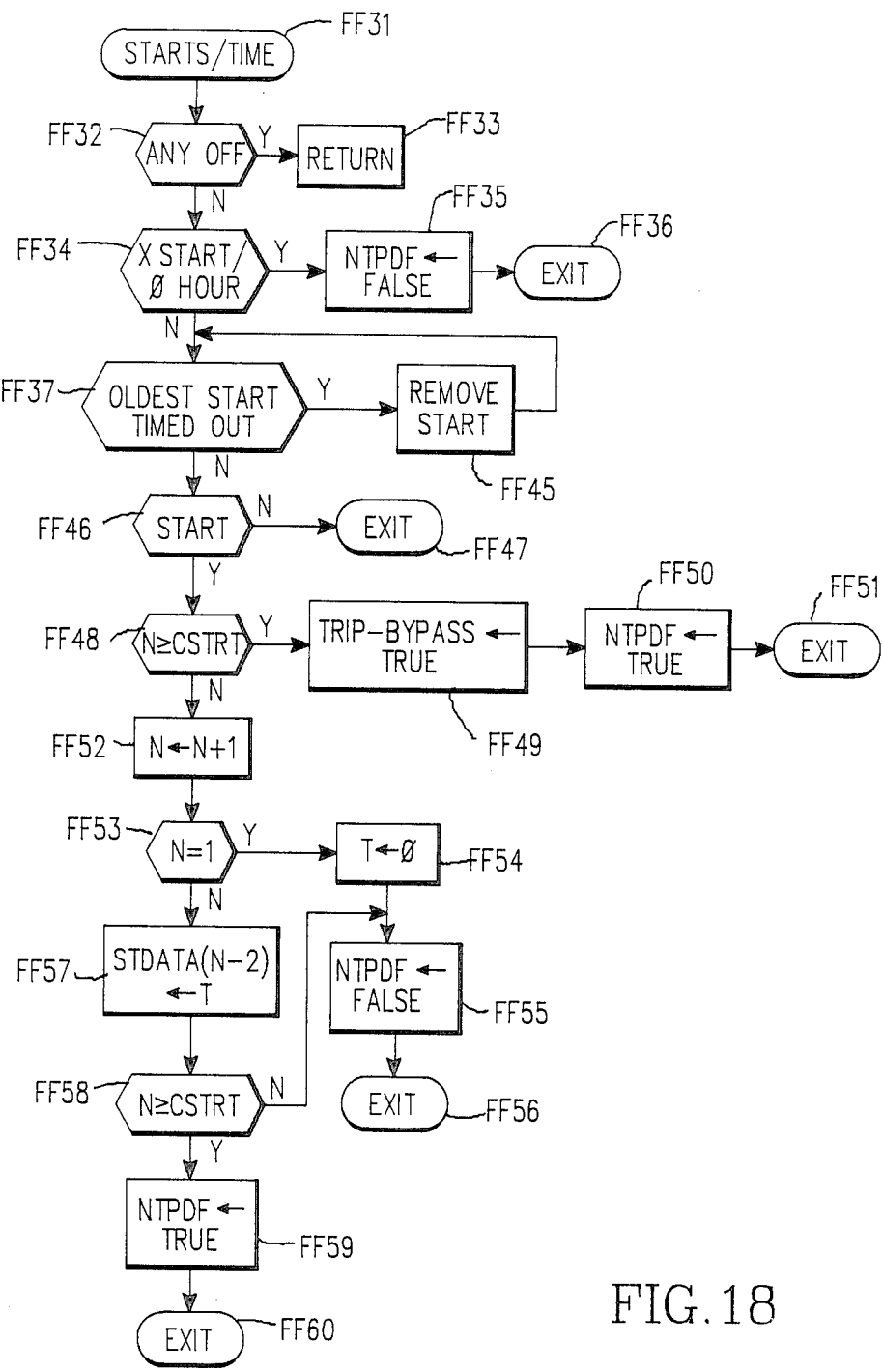
FIG. 18 shows the "STARTS/TIME" algorithm.
Figure 19:
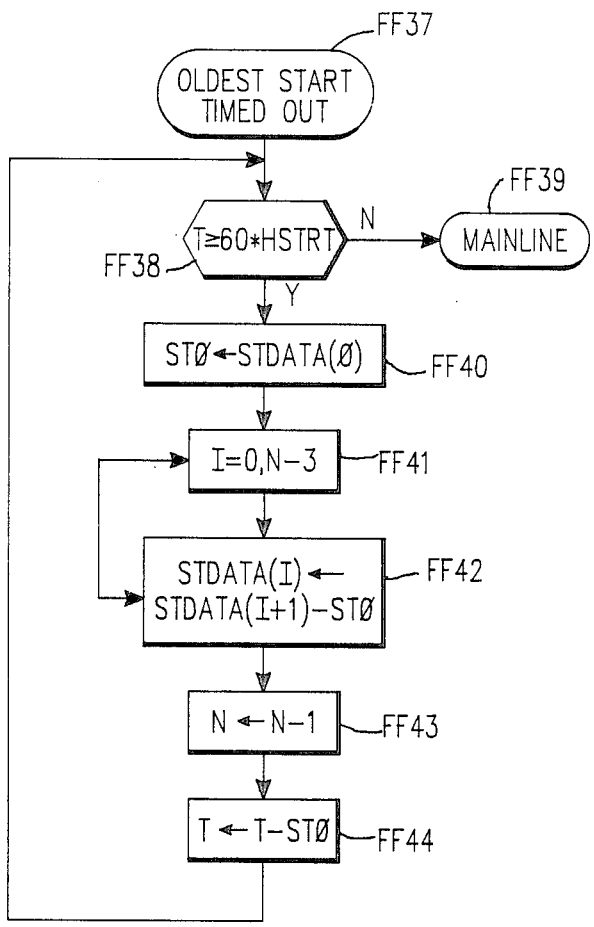
FIG. 19 shows the "OLDEST START TIME OUT" algorithm.
Figure 20:
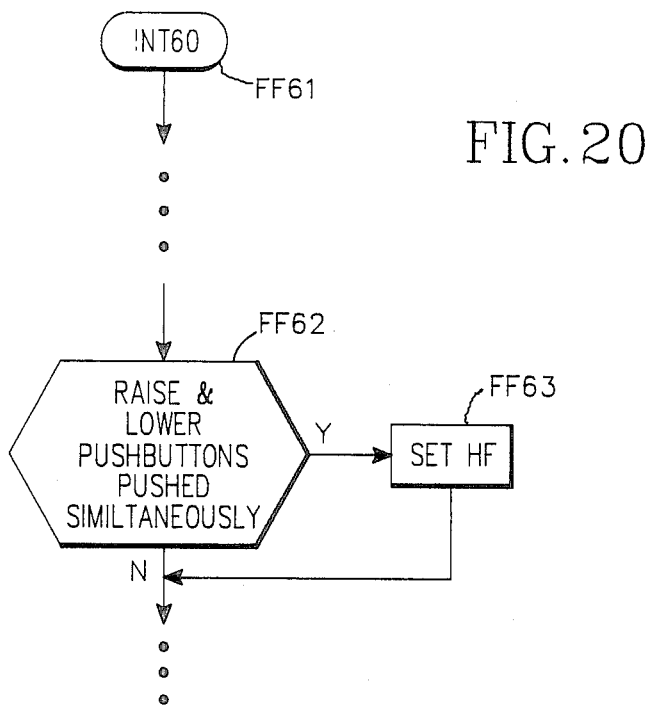
FIG. 20 shows a portion of the "INT 60" algorithm.
Figure 21:
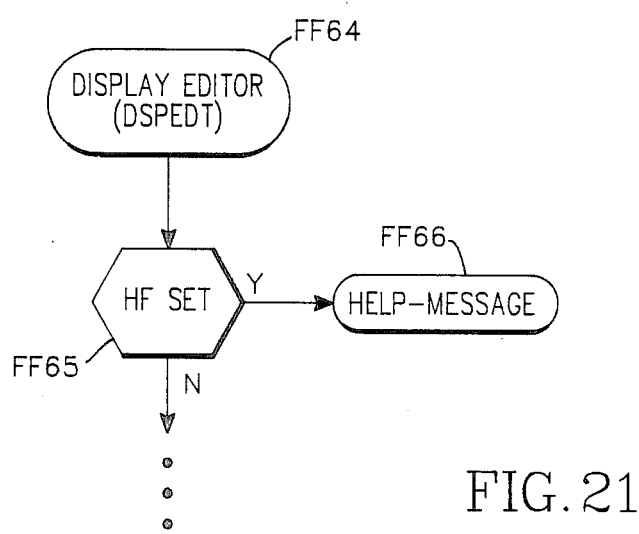
FIG. 21 shows a portion of the "DISPLAY EDITOR" algorithm.
Figure 22:
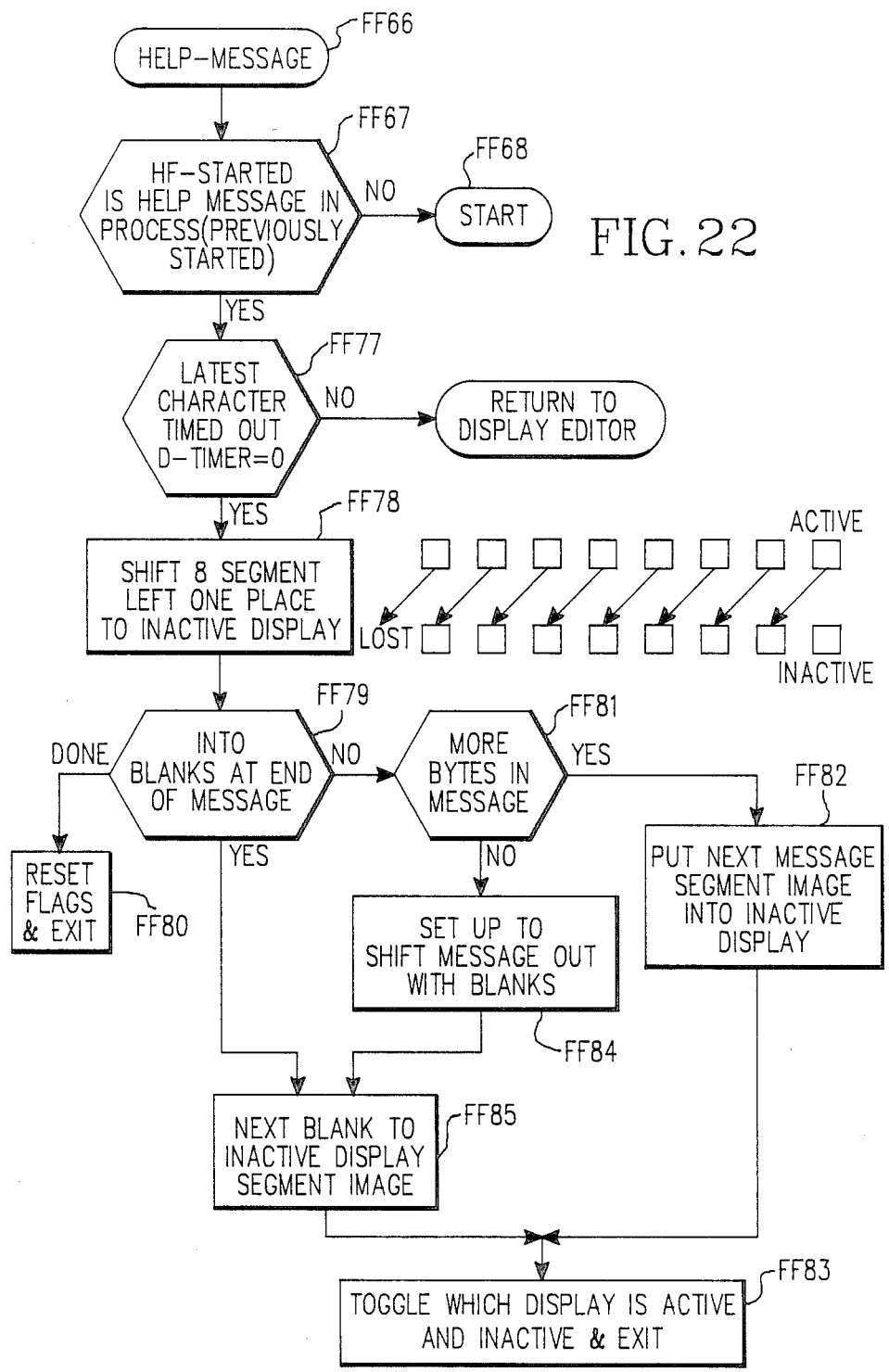
FIG. 22 shows the "HELP MESSAGE" algorithm.

Referring now to FIG. 18 and FIG. 19 the maximum STARTS PER TIME algorithm FF31 and the associated OLDEST START TIMED OUT algorithm FF37 are depicted. The microprocessor U107 operating in conjunction with the random access memory U101 and the programmable read only memory U102 has stored therein the previously described algorithms. Furthermore, the microprocessor monitors the requests for starts by looking for line current above a predetermined value as in FF13 of FIG. 17. A number of memory locations are set forth in the random access memory U101 for storing clusters of data which are important to the solution of the algorithms of FIGS. 18 and 18. The first information stored in the memory location is designated CSTR which is defined as the maximum allowed number of starts per the unit of time chosen by the operator. The next stored piece of information is the program value HSTRT which is the interval of time or maximum number of hours per the number of allowed starts described with respect to CSTRT. Memory locations are set aside for the function STDATA (N) which is defined as the start times in minutes past the first start for subsequent starts. There are as many entries in this region as there are determined requests for start. The next number stored in memory is the Number which is by definition the actual number of starts which has not timed out yet. That is, the actual number of starts which has taken place in the amount of time designated by HSTRT. The next memory location is fed by a clock and has stored therein the time factor T which is by definition time in minutes since the last oldest start. There is also provided by the microprocessor U107 as a result of utilization of the aforementioned subroutine a flag which is designated NTPDF. This flag indicates that the maximum number of starts have occurred in the aforementioned time period. This flag is utilized by the other portions of the microprocessor controlled monitor to prevent the next start until the flag disappears, to cause a trip if the motor is not running or to provide a conditional alarm if the motor is running. The reason for this latter point is the fact that an operator may not want to stop a motor which is running if the operator knows that the motor cannot be restarted again within an undesirably long time period. This case would typically arise when pulling preventive maintenance or the like. As a consequence of the indication of the aforementioned flag, NTPDF a signal is provided on the display 14 which indicates the amount of time that is remaining before a next start can take place. In the preferred embodiment of the invention this time is given in minutes. In utilizing the STARTS/TIME algorithm FF31 of FIG. 18, the first question that is asked in accordance with FF32 is are there any offs? If yes, then in accordance with FF33, the microprocessor U107 returns to another program. The next question that is asked in accordance with FF32 is, is the number of hours per allowed start equal zero, that is is HSTRT equal to zero? If the answer is yes, then the routine routes it way through FF35 and indicates that the flag NTPDF is false which means that the next start will be allowed. The algorithm or subroutine is then exited at FF36. However, if the answer to the aforementioned question in FF34 is no, then in accordance with FF37 the question is asked, is the oldest start timed out? As was mentioned previously, a separate algorithm found in FIG. 19 is utilized to answer that question. First, according to FF38 a question is asked, is the Time in minutes less than or equal to 60×HSTRT, which is as will be recalled the number of hours per allowed starts. The answers to that is yes. Then in accordance with FF40 microprocessor utilizes a special location STO and places therein the information from the STDATA (O) memory location, which is information related to the second oldest start. This essentially places the time between the second oldest start and the oldest start into location STO. The loop STDATA (I) at FF42 is replaced by STDATA (I+1)−STO is then iterated from I=0 to N−3 according to FF41. Thereafter in accordance with FF43 and FF44 the number N is decremented by one and the time T is decremented by the amount STO. This has the effect of removing the oldest start and placing the time for the next oldest start at zero. It is for this reason that the maximum time per allowed starts is always compared to the last oldest allowable start time. It can easily be seen for example that if the microprocessor is set up to allow four starts in five hours. If three starts have taken place in two hours, then the next start will be allowed sometime in the next three hours.

The STARTS/TIME algorithm then in accordance with FF37 answers the question is the question oldest start time timed out? If the answer is yes, that start time is removed from consideration in accordance with FF45. If the answer is no, then the microprocessor checks to see if a command to start exists according to FF46. If the answer is no, the subroutine is exited according to FF47. If the answer is yes, however, then the next question is asked in accordance with FF48. Is N (the actual number of starts not timed out), greater to or equal to the maximum allowed number of starts per time that is CSTRT. If the answer to that is yes, then according to FF49, a flag called trip bypass is set true and a message is provided on the display 14 indicating that a trip bypass has taken place. That is a start has occurred which should not have been allowed. Next the previously described flag NTPDF is set true according to FF50 which will attempt to inhibit any further starts. It does this by providing a conditional alarm as described previously if the motor is running and providing a trip signal if the motor is stopped, after that the routine is exited in accordance with FF51. However, if the answer to the question in FF48 is no then the number of starts is incremented by one in accordance with FF52 and the question is asked according to FF53 is N equal to one. If the answer is yes, then Time is set equal to zero according to FF54 and the flag NTPDF is set false in accordance with FF55 which means starts will be allowed. If on the other hand the answer to the question is N equal to one at FF53 is no then the Time in minutes since the last oldest start is placed in the location STDATA (N−2) according to FF57. And at this time the question is N equal to or greater CSTRT asked once again according to FF58. If the answer to that is no, then the flag NTPDF is set false according to FF55 and the routine is exited at FF56. If the answer to FF58, however, is yes, then the flag NTPDF is set true at FF59, which inhibits starts and sets the trip as was described previously and the subroutine or algorithm is exited at FF60.

Figure 23:
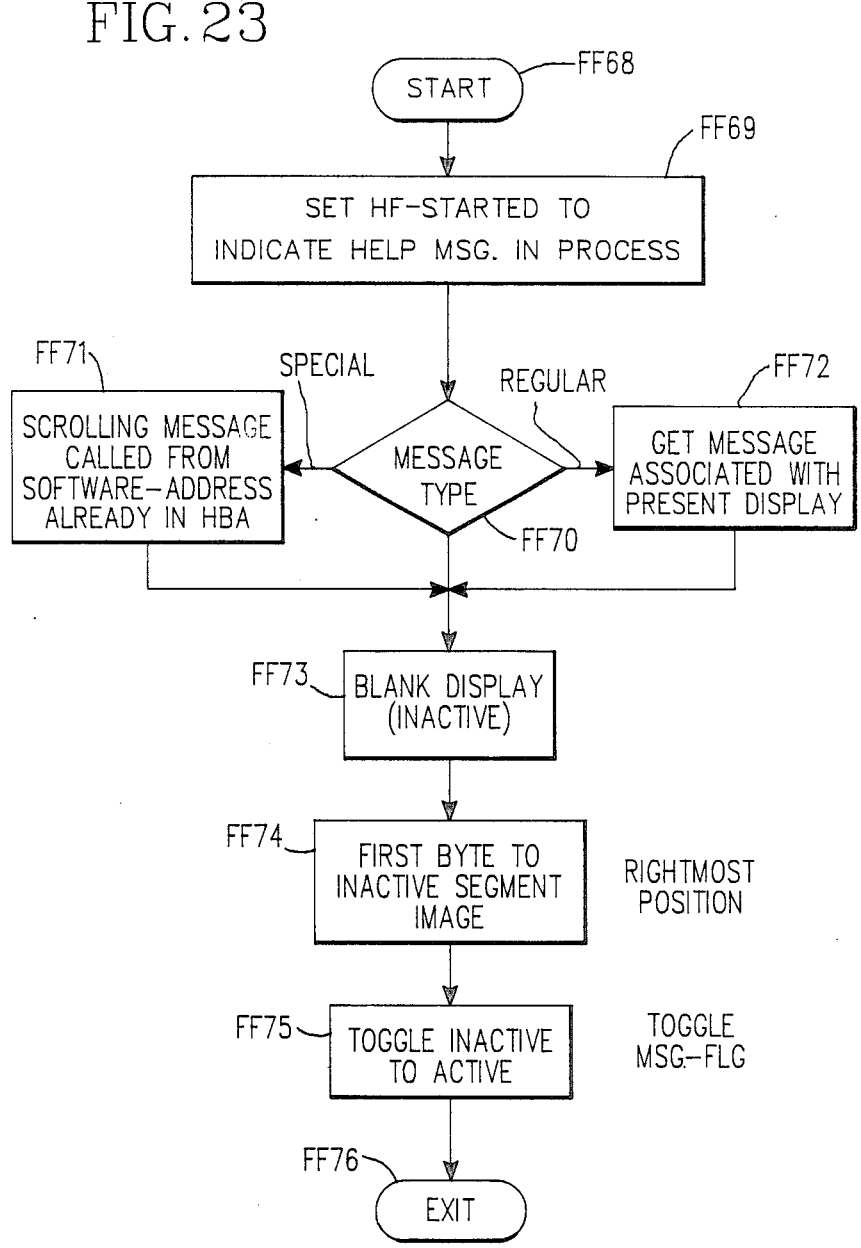
FIG. 23 shows the "START" algorithm.

Refer now to FIGS. 20, 21, 22 and 23 the "INT60", "DISPLAY EDITOR", "HELP MESSAGE" and "START" algorithms shown therein. These subroutines are stored as digital information in the previously described programmable read only memory U102. In addition a menu of Help messages as shown in Table 1 which are available for being displayed are stored in the same memory. A was described previously the microprocessor U107 communicates with the programmable read only memory U102 for instructions and operates in accordance therewith. The microprocessor by way fo DATA (7:0) databus communicates at appropriate times in accordance with the previously indicated algorithms with DEPORT0, DEPORT1 and DEPORT2 in a manner described previously to select and apply data to the readout 14 by way of the light emitting diode sets LD501, LD502, LD503 and LD504. The microprocessor uses the basic "INT60" algorithm FF61 on a regular basis for performing many functions. The INT60's algorithm or subroutine FF61 is an interrupt subroutine which iterates every 60 electrical degrees of a 60 cycle sine wave or six times a cycle. One of the things that the interrupt 60 subroutine asks at FF62 is whether the RAISE and LOWER pushbuttons SW403 and SW404 have been generally simultaneously actuated. If the answer to that is yes the subroutine at FF63 INT60 sets a flag designated HF in a memory so that at a later time a different subroutine may recognize the presence of the flag and act accordingly to provide a scrolling HELP DISPLAY message. Periodically the microprocessor calls upon the "DISPLAY EDITOR" subroutine or algorithm FF64 of FIG. 21. One of the questions that the latter mentioned "DISPLAY EDITOR"subroutine asks at FF65 is "Is the HF flag set?". If the answer to that is no the "DISPLAY EDITOR" continues along in its normal manner and nothing further will happen until the INT60 eventually sets the HF flag in which case the "DISPLAY EDITOR" will notice that the flag is set during its portion of activity and cause the microprocessor to go into the "HELP MESSAGE" subroutine of FIG. 22 at FF66. The first message that the "HELP MESSAGE"subroutine asks at FF67 is "Is there a "HELP MESSAGE" in progress?" If yes, then in accordance with FF68 the START algorithm is used. The "START" subroutine or algorithm FF68 is shown in FIG. 23. The first thing that the "START" subroutine does is shown in FF69 in which a flag entitled HF STARTED is set to indicate to the "HELP MESSAGE" subroutine that a "HELP MESSAGE" is now in progress. The next thing that the "START" subroutine does in accordance with FF70 is goes to the previously described memory at FF71 and picks out a relatively long descriptive scrollable message which is stored therein as found in Table 1. The message which is chosen is a function of the cryptic message which was on the display panel at the time the operator thereof indicated a call for help by simultaneously depressing the raise and lower pushbuttons SW403 and SW404 simultaneously. This operator action indicates that the operator is confused by the relatively short message that is on the display and wishes to acquire help from the display in the form of a relatively long message which is scrolled across the front of the display. The long message is more descriptive, has less abbreviations and is generally more helpful to the operator in understanding the function which the microprocessor is engaged in at the time of the message. Had no call for help been initiated, the microprocessor would have gone to FF72 to produce a regular message. Within the zero power RAM U101 two memory regions generally designated active and inactive are set aside. Each memory region has eight locations each of which is suitable for storing data associated with one alphanumeric character. By changing an appropriate bit in the memory locations the inactive memory can become the active memory and the active memory can become the inactive memory. This is alternately done during the performance of the "HELP MESSAGE" subroutine. Referring once again to the "START" subroutine the next thing that is done at FF73 is the inactive memory is addressed and provided with sufficient data as to create the logical representation of a clean memory slate in preparation of for receiving portions of the message which is to be displayed. The next thing that the "START" subroutine does as is shown at FF74 is to provide the first byte of the message to be scrolled to the right-most position of the inactive memory or image. This is the same as saying that the first word in the message is provided to the right-most of the eight memory locations. Eight memory locations are chosen because there are eight readout devices in the front panel 14. The next thing that the "START" subroutine does is toggle the inactive memory at FF75 to the active memory and vice versa. The first character is therefore provided to the right-most of the eight readout devices on the display 14. At that point a display timer having a time period of about 0.7 seconds in the preferred embodiment of the invention is started. The start routine is then exited at FF76 and the microprocessor continues utilizing other subroutines as they are necessary. Rather quickly, within a period of a 1/10 of a second or so, the "DISPLAY EDITOR" routine is entered again at FF64 and the question "is the help flag set?" is answered in the affirmative once again. This directs the microprocessor to the "HELP MESSAGE" subroutine as was the case previously. This time however in accordance with FF67 when the question "Has the HF started flag been set?" is answered the result is a yes in which case the "HELP MESSAGE" subroutine asks the question in accordance with FF77 "has the latest character timed out?" That is has the D timer which was set by the START subroutine as the first character was put into the display elapsed. As was mentioned previously this is approximately a 0.7 second timer which represents a time which appears to provide the best rate of scrolling across the display 14. If the answer to that is no which means that the previously supplied character has not been in place on the display for at least 0.7 seconds the "HELP MESSAGE" subroutine exits and the microprocessor picks up the "DISPLAY EDITOR" subroutine at FF78 once again and from there in accordance with FF66 immediately jumps back into the "HELP MESSAGE" subroutine. There once again it iterates FF77 and then answers the previous question concerning the status of the D timer. Eventually after iterating through this loop the answer to the question posed in FF77 will be yes which means that the first display character has been displayed for the time set by the D timer which was mentioned previously is about 0.7 seconds. At this point all of the memory information in the memory designated as active is shifted one place to the left in the inactive display in accordance with FF78. This is shown diagrammatically to the right of FF78 in FIG. 22. The microprocessor has the capability of determining when the message which is being supplied is finished. That is by noting when blanks begin to appear at the right portion of the display. Therefore in accordance with FF79 the microprocessor asks the question "Is the memory into the blanks at the end of the message?". There are three possible answers to that. If the answer is done, that means if all of the display locations in the inactive memory are blank then the entire "HELP MESSAGE" is done or over and the "HELP MESSAGE" subroutine is exited and all of the previously set flags are reset to the opposite condition and the entire series of subroutines exited until an operator requests another "HELP MESSAGE" as was described previously. This is done at FF80. On the other hand if the answer to the previous question set forth in FF79 is no then the microprocessor in accordance with FF81 asks the question "Are there more bytes in the message, that is are there more words to be displayed?" If the answer to that is yes in accordance with FF82 then the next message segment is placed in the inactive display on the right-most portion thereof and the active and inactive display are toggled once again at FF83 so that the information in the active display goes to the remaining portions of the inactive display. This is shown diagrammatically as indicated previously. Naturally the left-most character is completely lost as there is no remaining room for it in the inactive display and the inactive display now has the same message as previously with one new character to the right and the lost character being gone from the left. At this point the "HELP MESSAGE" subroutine is exited and picked up again in the manner previously described by way of the "DISPLAY EDITOR" message. The iterations continue on until the question posed in FF81 is No. In which case the subroutine then begins to fill blanks into the right portions of the inactive memory. This is done in accordance with FF89. Next in accordance with FF85 the next blank is provided to the inactive display segment image. After that occurs the active and inactive memories are once again interchanged at FF83 with the left shifting process described previously. Once again the "HELP MESSAGE" subroutine is exited and is reentered again at an appropriate time from the "DISPLAY EDITOR" subroutine. If the answer to the question posed by FF79 in the "HELP MESSAGE" subroutine is yes then the next blank is provided to the inactive display segment image in accordance with FF85 and then the active and inactive memories are interchanged once again at FF83 with the typical left shifting as was described previously.

TABLE I

HELP MESSAGES

SOFTWARE VERSION NUMBER
WINDING TEMP TRIP IN DEGREES
MOTOR BEARING TRIP IN DEGREES
LOAD BEARING TRIP IN DEGREES
WINDING TEMP ALARM IN DEGREES C.
MOTOR BEARING ALARM IN DEGREES C.
LOAD BEARING ALARM IN DEGREES C.
GROUND FAULT TRIP LEVEL IN AMPS
GROUND FAULT START DELAY IN CYCLES
GROUND FAULT RUN DELAY IN CYCLES
INSTANTANEOUS OVERCURRENT IN @ FLA
INSTANTANEOUS OVERCURRENT START DELAY IN CYCLES
LOCKED ROTOR CURRENT IN @ FLA
MAXIMUM ALLOWABLE STALL TIME IN SECONDS
ULTIMATE TRIP CURRENT IN @ FLA
12T ALARM LEVEL IN @ 12T TRIP
AUTO OR MANUAL 12T RESET
JAM TRIP LEVEL IN @ FLA
JAM START DELAY IN SECONDS
JAM RUN DELAY IN SECONDS
UNDER LOAD TRIP LEVEL IN @ FLA
UNDER LOAD START DELAY IN SECONDS
UNDER LOAD RUN DELAY IN SECONDS
PHASE UNBALANCE ALARM LEVEL
PHASE UNBALANCE RUN DELAY IN SECONDS
2 SECOND DELAY OR 12T TRIP ON PHASE UNBALANCE
STARTS PER TIME ALLOWED
TIME ALLOWED FOR STARTS COUNT IN HOURS
MOTOR START TRANSITION CURRENT LEVEL IN @ FLA
MOTOR START TRANSITION TIME IN SECONDS
TRANSITION OR TRIP ON TIME OUT
INCOMPLETE SEQUENCE REPORT BACK TIME
ANTI-BACKSPIN DELAY TIME IN SECONDS
FULL LOAD AMPS
50 OR 60 HERTZ LINE FREQUENCY
TRIP MODE 1 - TRIP RELAY ENERGIZES ON TRIP CONDITION
TRIP MODE 2 - TRIP RELAY ENERGIZED ON POWERUP AND DENERGIZES ON TRIP CONDITION
REVERSING OR NONREVERSING STARTER
TRIP OR RESET ON REMOTE INPUT
CT RATIO - N TURNS TO 1
PHASE A CURRENT IN AMPS
PHASE B CURRENT IN AMPS
PHASE C CURRENT IN AMPS
PERCENT FULL LOAD CURRENT PHASE A
PERCENT FULL LOAD CURRENT PHASE B
PERCENT FULL LOAD CURRENT PHASE C
WINDING TEMP 1 IN DEGREES C.
WINDING TEMP 2 IN DEGREES C.
WINDING TEMP 3 IN DEGREES C.
WINDING TEMP 4 IN DEGREES C.
WINDING TEMP 5 IN DEGREES C.
WINDING TEMP 6 IN DEGREES C.
MOTOR BEARING TEMP 1 IN DEGREES C.
MOTOR BEARING TEMP 2 IN DEGREES C.
LOAD BEARING TEMP 1 IN DEGREES C.
LOAD BEARING TEMP 2 IN DEGREES C.
OPERATION COUNT
RUN TIME IN HOURS
REMAINING STARTS
TIME LEFT ON OLDEST START IN MINUTES
ALLOWED STARTS EXCEEDED/WAIT IN MINUTES
INSTANTANEOUS OVER CURRENT RIP
LOCKED ROTOR/THERMAL OVERLOAD TRIP
PHASE UNBALANCE TRIP
GROUND FAULT TRIP
LOAD JAM TRIP
UNDER LOAD RUN TRIP
TRIP BYPASS (JUMPER BYPASS OF IQ1000 TRIP RELAY
REMOTE TRIP
MOTOR BEARING OVER TEMPERATURE TRIP

TABLE I-continued

HELP MESSAGES

LOAD BEARING OVER TEMPERATURE TRIP
STATOR WINDING OVER TEMPERATURE TRIP
PHASE REVERSAL TRIP
INCOMPLETE SEQUENCE TRIP
A/D CONVERTER ERROR TRIP
RAM ERROR TRIP
ROM ERROR TRIP
OPTO COUPLER FAILURE TRIP
L TO H VOLTS TRANSITION ERROR TRIP
IMPROPER CT RATIO FOR FLA SETTING
NON VOLATILE MEMORY ELEMENT SHOULD BE REPLACED
TRIP REQUESTED OVER INCOM NETWORK
PHASE UNBALANCE ALARM
STATOR WINDING TEMPERATURE ALARM
MOTOR BEARING TEMPERATURE ALARM
LOAD BEARING TEMPERATURE ALARM
UNASSIGNED FAULT MESSAGE ERROR
PERCENT OF I2T TRIP REACHED, TRIP WILL OCCUR IF MOTOR STOPPED
MAX NUMBER OF STARTS PER TIME REACHED
WHILE RUNNING ALARM ONLY, IF STOPPED BECOMES TRIP
READY TO START MOTOR
ATTEMPTING TO START MOTOR
MOTOR IS RUNNING
ANTI-BACKSPIN ACTIVE, STARTING PROHIBITED

We claim:

1. Apparatus which performs an operation as a function of the temperature $T_{Rn}$ of a rotating rotor at a given instant of time comprising:
   temperature sensing means for determining the temperature $T_S$ of a stator which is mechanically associated with said rotating rotor;
   current sensing means for digitally sampling the electrical current I flowing in the windings of said stator at a sampling rate $\beta$, where current I is electromagnetically associated with said rotating rotor;
   digital calculating means interconnected with said temperature sensing means and said current sensing means for determining said rotor temperature $T_{Rn}$ according to the following relationship:

$$T_{Rn} = T_{R(n-1)} + \frac{\delta}{\beta}(K_1 I^2 + K_2 T_S - K_3 T_{R(n-1)})$$

where:
$\delta = \beta \Delta t$
$\Delta t$ = the time between the preceding time said stator temperature was determined and said given instant of time,
$T_{R(n-1)}$ = the rotor temperature of said preceding time,
$K_1$, $K_2$ and $K_3$ are constants; and means interconnected with said digital calculating means for performing said operation as a function of $T_{Rn}$.

2. Apparatus which performs an operation as a function of the temperature $T_{Rn}$ of a rotating rotor at a given instant of time comprising:
   temperature sensing means for determining the temperature $T_S$ of a stator which is mechanically associated with said rotating rotor;
   current sensing means for digitally sampling the electrical current I flowing in the windings of said stator at a constant sampling rate $\beta$, where current I is electromagnetically associated with said rotating rotor;
   digital calculating means interconnected with said temperature sensing means and said current sensing means for determining said rotor temperature $T_{Rn}$ according to the following relationship:

$$T_{Rn} = T_{R(n-1)} + \delta(K_4 I^2 + K_5 T_S - K_6 T_{R(n-1)})$$

where:
$\delta = \beta \Delta t$
$\Delta t$ = the time between the preceding time said stator temperature was determined and said given instant of time,
$T_{R(n-1)}$ = the rotor temperature of said preceding time,
$K_4$, $K_5$ and $K_6$ are constants; and means interconnected with said digital calculating means for performing said operation as a function of $T_{Rn}$.

3. Apparatus which protects a motor as a function of the temperature $T_{Rn}$ of the rotating rotor of said motor, at a given instant of time comprising:
   temperature sensing means for determining the temperature $T_S$ of the stator of said motor;
   current sensing means for digitally sampling the electrical current I flowing in the windings of said stator at a sampling rate $\beta$;
   digital calculating means interconnected with said temperature sensing means and said current sensing means for determining said rotor temperature $T_{Rn}$ according to the following relationship:

$$T_{Rn} = T_{R(n-1)} + \delta(K_4 I^2 + K_5 T_S - K_6 T_{R(n-1)})$$

where:
$\delta = \beta \Delta t$
$\Delta t$ = the time between the preceding time said stator temperature was determined and said given instant of time,
$T_{R(n-1)}$ = the rotor temperature of said preceding time,
$K_1$, $K_2$ and $K_3$ are constants; and protection means interconnected with said digital calculating means for protecting said motor as a function of $T_{Rn}$.

4. The apparatus as claimed in claim 3 wherein said motor is stopped if $T_{Rn}$ exceeds a predetermined value.

5. The apparatus as claimed in claim 3 wherein a warning is provided if $T_{Rn}$ exceeds a predetermined value.

6. The apparatus as claimed in claim 5 wherein said warning is visually displayed.

7. Apparatus which performs an operation as a function of the value $\lambda$ which is related to the temperature $T_{Rn}$ of a rotating rotor at a given instant of time, where $\lambda$ has a unit of current squared times time, comprising:
   temperature sensing means for determining the temperature $T_S$ of a stator which is mechanically associated with said rotating rotor and for converting said temperature $T_S$ to a value $\lambda_S$ which is related to said stator temperature $T_S$ and which has a unit of current squared times time;
   current sensing means for digitally sampling the electrical current I flowing in the windings of said stator at a sampling rate $\beta$, where current I is electromagnetically associated with said rotating rotor;
   digital calculating means interconnected with said temperature sensing means and siad current sensing means for determining a value $\lambda_{Rn}$ according to the following relationship:

$$\lambda_{Rn} = \lambda_{R(n-1)} + \frac{\delta}{\beta} [K_7 I^2 + K_8 \lambda_S - K_g \lambda_{R(n-1)}]$$

where:

$\delta = \beta \Delta t$ $\Delta t$ = the time between the preceding time said $\lambda_S$ was determined and said given instant of time, $\lambda_{R(n-1)}$ = the rotor $\lambda$ at said preceding time, $K_7$, $K_8$ and $K_9$ are constants; and means interconnected with said digital calculating means for performing said operation as a function of $\lambda_{Rn}$.

8. Apparatus which performs an operation as a function of the value $\lambda$ which is related to the temperature $T_{Rn}$ of a rotating rotor at a given instant of time, where $\lambda$ has a unit of current squared times time, comprising:

temperature sensing means for determining the temperature $T_S$ of a stator which is mechanically associated with said rotating rotor and for converting said temperature $T_S$ to a value $\lambda_S$ which is related to said stator temperature $T_S$ and which has a unit of current squared times time;

current sensing means for digitally sampling the electrical current I flowing in the windings of said stator at a constant sampling rate $\beta$, where current I is electromagnetically associated with said rotating rotor;

digital calculating means interconnected with said temperature sensing means and said current sensing means for determining a value $\lambda_{Rn}$ according to the following relationship:

$$\lambda_{Rn} = \lambda_{R(n-1)} + \delta[K_{10} I^2 + K_{11} \lambda_S - K_{12} \lambda_{R(n-1)}]$$

where:

$\delta = \beta \Delta t$ $\Delta t$ = the time between the preceding time said $\lambda_S$ was determined and said given instant of time, $\lambda_{R(n-1)}$ = the rotor $\lambda$ at said preceding time, $K_{10}$, $K_{11}$ and $K_{12}$ are constants; and means interconnected with said digital calculating means for performing said operation as a function of $\lambda_{Rn}$.

9. Apparatus which protects a motor as a function of the value $\lambda$ which is related to the temperature $T_{Rn}$ of a rotating rotor of said motor at a given instant of time, where $\lambda$ has a unit of current squared times time, comprising:

temperature sensing means for determining the temperature $T_S$ of the stator of said motor and for converting said temperature $T_S$ to a value $\lambda_S$ which is related to said stator temperature $T_S$ and which has a unit of current squared times time;

current sensing means for digitally sampling the electrical current I flowing in the windings of said stator at a sampling rate $\beta$;

digital calculating means interconnected with said temperature sensing means and said curent sensing means for determining a value $\lambda_{Rn}$ according to the following relationship:

$$\lambda_{Rn} = \lambda_{R(n-1)} + \frac{\delta}{\beta} [K_7 I^2 + K_8 \lambda - K_g \lambda_{R(n-1)}]$$

where:

$\delta = \beta \Delta t$ $\Delta t$ = the time between the preceding time said $\lambda_S$ was determined and said given instant of time, $\lambda_{R(n-1)}$ = the rotor $\lambda$ at said preceding time, $K_7$, $K_8$ and $K_9$ are constants; and protection means interconnected with said digital calculating means for protecting said motor as a function of $\lambda_{Rn}$.

10. The apparatus as claimed in claim 9 wherein said motor is stopped if $\lambda_{Rn}$ exceeds a predetermined value.

11. The apparatus as claimed in claim 9 wherein a warning is provided if $\lambda_{Rn}$ exceeds a predetermined value.

12. The apparatus as claimed in claim 11 wherein said warning is visually displayed.

13. Apparatus which protects a motor as a function of the value $\lambda$ which is related to the temperature $T_{Rn}$ of a rotating rotor of said motor at a given instant of time, where $\lambda$ has a unit of current squared times time, comprising:

temperature sensing means for determining the temperature $T_S$ of the stator of said motor and for converting said temperature $T_S$ to a value $\lambda_S$ which is related to said stator temperature $T_S$ and which has a unit of current squared times time;

current sensing means for digitally sampling the electrical current I flowing in the windings of said stator at a constant sampling rate $\beta$;

digital calculating means interconnected with said temperature sensing means and said current sensing means for determining a value $\lambda_{Rn}$ according to the following relationship:

$$\lambda_{Rn} = \lambda_{R(n-1)} + \frac{\delta}{\beta} [K_7 I^2 + K_8 \lambda - K_g \lambda_{R(n-1)}]$$

where:

$\delta = \beta \Delta t$ $\Delta t$ = the time between the preceding time said $\lambda_S$ was determined and said given instant of time, $\lambda_{R(n-1)}$ = the rotor $\lambda$ at said preceding time, $K_7$, $K_8$ and $K_9$ are constants;

$I^2 = I_p + 6 I_n$: where $I_p$ is the positive sequence component of the three phase line current supplying said motor and In is the negative sequence component of said three phase line current supplying said motor; and protection means interconnected with said digital calculating means for protecting said motor as a function of $\lambda_{Rn}$.

* * * * *